United States Patent
Churchill et al.

(10) Patent No.: US 10,233,991 B2
(45) Date of Patent: Mar. 19, 2019

(54) ADJUSTABLE NEGATIVE STIFFNESS MECHANISMS

(71) Applicant: HRL LABORATORIES, LLC, Malibu, CA (US)

(72) Inventors: Christopher B. Churchill, Ventura, CA (US); Casey J. Sennott, Malibu, CA (US); Sloan P. Smith, Calabasas, CA (US); David W. Shahan, Los Angeles, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/405,030

(22) Filed: Jan. 12, 2017

(65) Prior Publication Data

US 2018/0195571 A1 Jul. 12, 2018

(51) Int. Cl.
*F16F 1/22* (2006.01)
*F16F 3/02* (2006.01)
(Continued)

(52) U.S. Cl.
CPC .................. *F16F 1/22* (2013.01); *F16F 3/02* (2013.01); *F16F 15/046* (2013.01);
(Continued)

(58) Field of Classification Search
CPC ........ F16F 1/18; F16F 1/22; F16F 1/26; F16F 3/02; F16F 3/023; F16F 15/046;
(Continued)

(56) References Cited

U.S. PATENT DOCUMENTS 4,722,517 A * 2/1988 Dijkstra .................. H04R 1/42
267/160
5,310,157 A * 5/1994 Platus ..................... F16F 3/026
248/619
(Continued)

FOREIGN PATENT DOCUMENTS

GB 617076 A * 2/1949 ................ F16F 1/26
WO WO 2016/093810 A1 6/2016

OTHER PUBLICATIONS

International Search Report and Written Opinion dated Oct. 12, 2017 for corresponding PCT Application No. PCT/US2017/013219 (16 pages).
(Continued)

*Primary Examiner* — Thomas J Williams
(74) *Attorney, Agent, or Firm* — Lewis Roca Rothgerber Christie, LLP

(57) ABSTRACT

An adjustable negative stiffness mechanism is disclosed. The adjustable negative stiffness mechanism includes a central shaft, an outer annular member extending around the central shaft, at least two negative stiffness elements extending between the central shaft and the annular member, and an actuator coupled to the negative stiffness elements. Each of the negative stiffness elements has an inner end coupled to the central shaft and an outer end engaging the annular member. The actuator is configured to compress and expand the negative stiffness elements to adjust a negative stiffness mechanical response exhibited by the negative stiffness elements.

17 Claims, 11 Drawing Sheets

(51) Int. Cl.
*F16F 15/073* (2006.01)
*F16F 15/04* (2006.01)

(52) U.S. Cl.
CPC ...... *F16F 15/073* (2013.01); *F16F 2228/063* (2013.01); *F16F 2228/066* (2013.01)

(58) Field of Classification Search
CPC .... F16F 15/06; F16F 15/073; F16F 2228/063; F16F 2228/066; F16F 2230/183; F16F 2230/06; F16F 2236/027
USPC ........................................................ 267/160
See application file for complete search history.

(56) References Cited

U.S. PATENT DOCUMENTS

| | | |
|---|---|---|
| 6,234,127 B1 | 5/2001 | Simpson et al. |
| 9,394,950 B1 | 7/2016 | Henry et al. |
| 2010/0009796 A1 | 1/2010 | Fitz |
| 2013/0079159 A1 | 3/2013 | Brosowske |
| 2015/0204413 A1* | 7/2015 | Churchill .............. F16F 15/022 248/550 |
| 2016/0348752 A1* | 12/2016 | Churchill .............. F16F 15/073 |

OTHER PUBLICATIONS

Kim et al., "Hybrid Dual Actuator Unit: A Design of a Variable Stiffness Actuator based on an Adjustable Moment Arm Mechanism," IEEE International Conference on Robotics and Automation, pp. 1655-1660, May 3-8, 2010.

Rivin, "Stiffness and Damping of Mechanical Structure," pp. 154-159, 2010.

Schiavi et al., "VSA-II: a Novel Prototype of Variable Stiffness Actuator for Safe and Performing Robots Interacting with Humans," IEEE International Conference on Robotics and Automation, pp. 2171-2176, May 19-23, 2008.

* cited by examiner

ADJUSTABLE NEGATIVE STIFFNESS MECHANISMS

FIELD

The following description relates generally to negative stiffness mechanisms and, more particularly, to adjustable negative stiffness mechanisms.

BACKGROUND

A variety of non-linear structures exhibit negative mechanical stiffness, such as snap-through beams and buckling beams. Negative stiffness may also be exhibited by various combinations and arrangements of springs and/or beams with pinned or clamped boundaries. For instance, negative stiffness may be exhibited due to over-rotation of one of the components, or rolling or sliding contact between components. Negative stiffness mechanisms are useful in a variety of applications, including vibration isolation, shock mitigation, and signal processing.

However, many related art negative stiffness mechanisms do not incorporate a variable negative stiffness spring. For instance, related art negative stiffness mechanisms may incorporate an external cam to change the effective length of a lever attached to a variable stiffness spring or a variable pivot point for a leveraged spring. Other related art negative stiffness mechanisms include a variable stiffness spring having a lever supported by antogonistic non-linear springs (e.g., rubber cones). However, each of these related art negative stiffness mechanisms are incapable of supporting a significant load when the mechanism is soft, which make them of limited use as an isolator.

Additionally, other related art negative stiffness mechanisms may incorporate pneumatic, hydraulic, hydropneumatic, voice coil, and/or piezoelectric components. However, related art negative stiffness mechanisms that incorporate pneumatic components may require large volume air springs and high-friction seals, which prevent isolation of low amplitude vibrations. Additionally, related art negative stiffness mechanisms that incorporate voice coil or piezoelectric components may not be capable of isolating larger amplitude vibrations.

SUMMARY

The present disclosure is directed to various embodiments of an adjustable negative stiffness mechanism. In one embodiment, the adjustable negative stiffness mechanism includes a central shaft, an outer annular member extending around the central shaft, at least two negative stiffness elements extending between the central shaft and the outer annular member, each of the at least two negative stiffness elements having an inner end coupled to the central shaft and an outer end engaging the outer annular member, and an actuator coupled to the at least two negative stiffness elements. The actuator is configured to compress and expand the at least two negative stiffness elements to adjust a negative stiffness mechanical response exhibited by the at least two negative stiffness elements. The actuator may include a hydraulic or pneumatic bladder configured to move between an inflated state to compress the at least two negative stiffness elements and a deflated state to expand the at least two negative stiffness elements. The actuator may include a pair of corresponding wedge-shaped members. A first wedge-shaped member of the pair of wedge-shaped members may be configured to slide relative to a second wedge-shaped member of the pair of wedge-shaped members. The actuator may include an inner cam surface on the annular member configured to engage the outer ends of the at least two negative stiffness elements and a motor operatively coupled to the annular member to rotate the annular member around the central shaft. The inner cam surface includes at least one peak and at least one recess. The rotation of the annular member around the central shaft alternately aligns the at least one peak on the cam surface with the negative stiffness elements to compress the negative stiffness elements and aligns the at least one recess on the cam surface to expand the negative stiffness elements. The actuator may also include a flexure coupled to the outer end of each of the at least two negative stiffness members. Each of the flexures is configured permit movement of the outer ends of the negative stiffness members in a first direction and prevent movement of the outer ends of the negative stiffness members in a second direction perpendicular to the first direction. The actuator may include a series of tracks defined in the annular member and a motor operatively coupled to the annular member. Each of the tracks has a first end spaced apart from the central shaft by a first distance and a second end spaced apart from the central shaft by a second distance greater than the first distance. The outer end of each of the negative stiffness elements is slidably received in one of the tracks. The motor is configured to rotate the annular member around the central shaft and move the outer ends of the negative stiffness elements between the first and second ends of the tracks in the annular member. The adjustable negative stiffness mechanism may also include at least one ortho-planar spring extending between the central shaft and the outer annular member. The adjustable negative stiffness mechanism may also include at least one coil spring coupled to the central shaft. Each of the at least two negative stiffness members may include a first beam buckled in a first direction and a second plate buckled in a second direction opposite the first direction.

An adjustable negative stiffness mechanism according to another embodiment of the present disclosure includes a central shaft, an outer annular member extending around the central shaft, at least two negative stiffness elements extending between the central shaft and the annular member, a flexure coupled to the outer end of each of the at least two negative stiffness members, and a first motor operatively coupled to the outer annular member to rotate the outer annular member around the central shaft. The outer annular member includes an inner cam surface having a series of peaks and a series of recesses. Each of the negative stiffness elements includes an inner end fixedly coupled to the central shaft and an outer end engaging the inner cam surface. Each of the flexures is configured permit movement of the outer ends of the negative stiffness members in a first direction and prevent movement of the outer ends of the negative stiffness members in a second direction perpendicular to the first direction. Rotation of the outer annular member around the central shaft alternately aligns the series of peaks on the inner cam surface with the outer ends of the negative stiffness elements to compress the negative stiffness elements and aligns the series of recesses on the inner cam surface with the outer ends of the negative stiffness elements to expand the negative stiffness elements. The adjustable negative stiffness mechanism may include an ortho-planar spring coupled to the central shaft. A position of the ortho-planar spring may be adjustable. The adjustable negative stiffness mechanism may include a top plate coupled to the central shaft, a bottom plate spaced apart from the top plate, wherein the bottom plate is configured to slide along the central shaft, at least one coil spring extending between the bottom plate and the top plate, and a second motor operatively coupled to the bottom plate. The second motor is configured to move the bottom plate toward and away from the top plate to compress and elongate the at least one coil spring. The adjustable negative stiffness mechanism may include a thrust bearing and a coil spring container rotatably supported on the thrust bearing. The coil spring container includes internal threads configured to engage external threads on the bottom plate. The second motor is configured to rotate the coil spring container such that the external threads engage the internal threads to move the bottom plate toward and away from the top plate to compress and elongate the at least one coil spring. The adjustable negative stiffness mechanism may include a containment vessel housing the outer annular member, the at least two negative stiffness elements, the flexures, the top plate, the bottom plate, and the at least one coil spring. The first and second motors may be coupled to an outer surface of the containment vessel.

The present disclosure is also directed to various embodiments of an adjustable negative stiffness system. In one embodiment, the negative stiffness system includes a central input gear assembly, a series of adjustable negative stiffness mechanisms arranged around the central input gear assembly, and an outer ring extending around the series of adjustable negative stiffness mechanisms. Each of the adjustable negative stiffness mechanisms engages the central input gear assembly and the outer ring. Each of the adjustable negative stiffness mechanisms includes a central portion configured to receive a central shaft, an outer annular member extending around the central portion, at least two negative stiffness elements extending between the central portion and the annular member, and a plurality of tracks defined in the outer annular member. Each of the at least two negative stiffness elements includes an inner end coupled to the central portion and an outer end engaging the outer annular member. Each of the tracks has a first end spaced apart from the central portion by a first distance and a second end spaced apart from the central portion by a second distance greater than the first distance. The outer end of each of the negative stiffness elements is slidably received in one of the plurality of tracks. The adjustable negative stiffness system may include from two to ten adjustable negative stiffness mechanisms. The adjustable negative stiffness system may include an orthoplanar spring coupled to each of the negative stiffness mechanisms. The adjustable negative stiffness system may include a drive shaft coupled to the central input gear assembly to rotate the central input gear assembly. Rotation of the central input gear assembly synchronously rotates the outer annular members around the central portions and moves the outer ends of the negative stiffness elements between the first and second ends of the tracks in the outer annular member. An outer surface of each the outer annular members of the negative stiffness mechanisms may include a series of teeth configured to engage a series of teeth on an inner surface of the outer ring and a series of teeth on outer surface of the central input gear assembly.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale

FIGS. 5C and 5B are perspective views of the embodiment of the adjustable negative stiffness unit cell illustrated in FIGS. 5A and 5B in an expanded position and a compressed position, respectively.

DETAILED DESCRIPTION

The present disclosure is directed to various embodiments of an adjustable negative stiffness unit cell configured to vary the mechanical response of the unit cell. The present disclosure is also directed to a system of negative stiffness unit cells in which the mechanical response of each of the negative stiffness unit cells can be adjusted simultaneously and synchronously. The negative stiffness unit cells of the present disclosure may be incorporated into any desired structure or device depending on the intended purpose or function of the negative stiffness structure, such as, for instance, as a tuned-mass damper or as a mechanism for vibration isolation, shock mitigation, or signal processing. For instance, the adjustable negative stiffness unit cells and mechanisms of the present disclosure may be incorporated into a structure as a payload mount (e.g., a mount for sensitive electronics on a helicopter that is configured to isolate the electronics from multiple rotor frequencies) or as a component of a vehicle (e.g., as a motor mount for an automobile configured to isolate vibration between the engine and the chassis).

Figure 1:
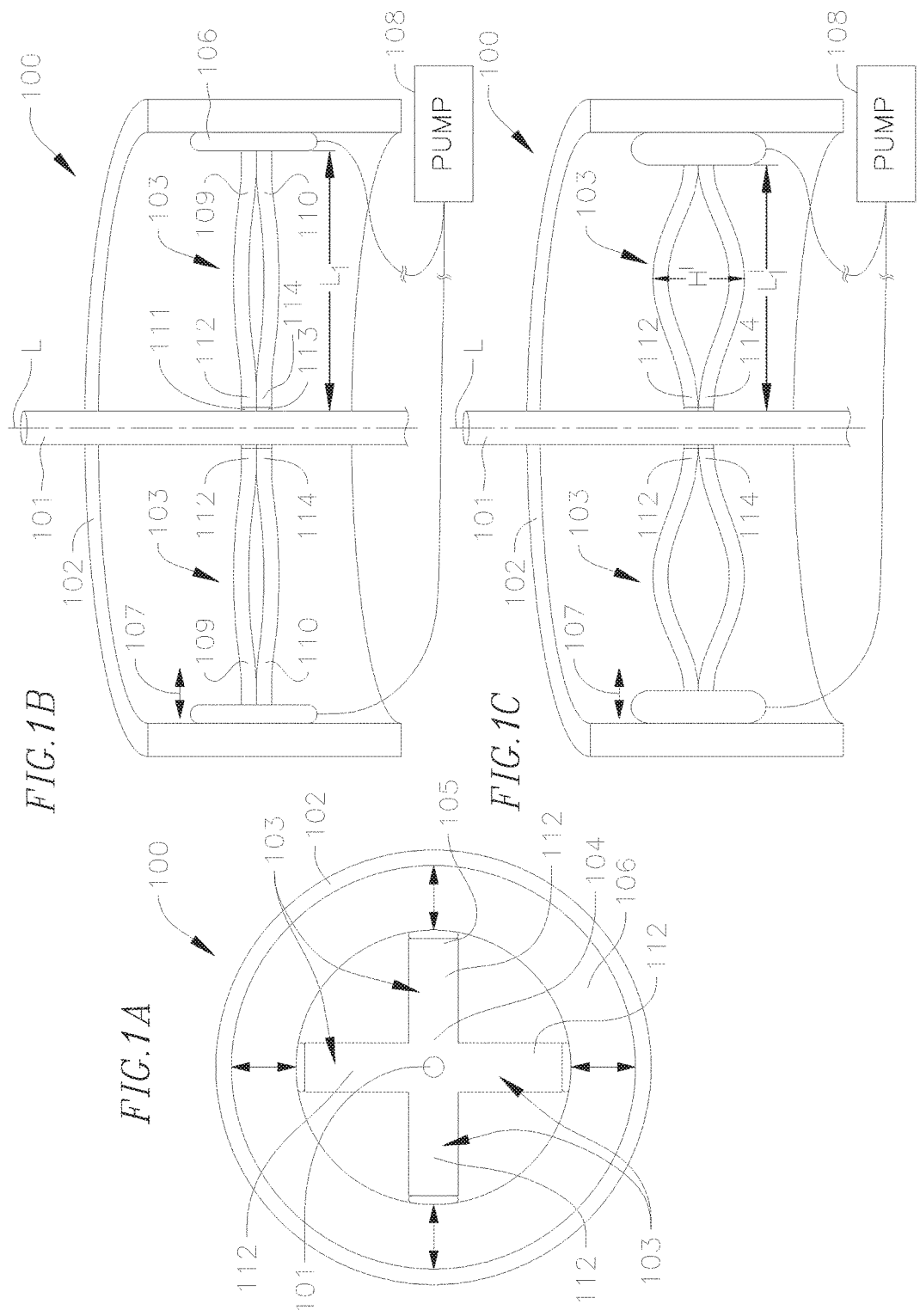
FIG. 1A is a top view of an adjustable negative stiffness unit cell according to one embodiment of the present disclosure.
FIGS. 1B and 1C are cross-sectional views of the embodiment of the adjustable negative stiffness unit cell illustrated in FIG. 1A in a first state and a second state, respectively.

With reference now to FIGS. 1A and 1B, a negative stiffness unit cell 100 according to one embodiment of the present disclosure includes a central shaft 101 defining a longitudinal axis L, an annular member 102 (e.g., a ring) extending around the central shaft 101, a plurality of negative stiffness elements 103 extending radially outward between the central shaft 101 and the annular member 102. In the illustrated embodiment, each of the plurality of negative stiffness elements 103 includes an inner end 104 fixedly coupled to the central shaft 101 and an outer end 105 proximate the annular member 102. In the illustrated embodiment, the negative stiffness unit cell 100 includes four negative stiffness elements 103 circumferentially and equidistantly spaced around the central shaft 101, although in one or more embodiments, the negative stiffness unit cell 100 may include any other suitable number of negative stiffness elements 103, such as, for instance, from two to ten negative stiffness elements 103.

Additionally, in the illustrated embodiment, the negative stiffness unit cell 100 includes at least one actuator 106 coupled to the outer end 105 of each of the negative stiffness elements 103. The actuator 106 is configured to move between a deflated position (see FIG. 1B) and an inflated position (see FIG. 1C) to move the negative stiffness elements 103 between an elongated or relaxed state and a compressed state, respectively. In the illustrated embodiment, the actuator 106 is configured to expand and contract radially inward and radially outward (arrow 107) to compress and relax, respectively, the negative stiffness elements 103. The one or more actuators 106 may be any suitable type or kind of mechanism configured to compress and relax the negative stiffness elements 103, such as for instance, a hydraulic bladder, a pneumatic bladder, or a piston. In the illustrated embodiment, the negative stiffness unit cell 100 also includes a fluid delivery unit 108 (e.g., a pump) coupled to the one or more actuators 106 that is configured to supply and withdraw fluid (e.g., a gas or a liquid) to the one or more actuators 106 and thereby move the one or more actuators 106 between the deflated and inflated states. Although in the illustrated embodiment the negative stiffness unit cell 100 includes a single actuator 106 extending continuously around an inner periphery of the annular member 102, in one or more embodiments, the negative stiffness unit cell 100 may include any other suitable number of actuators, such as, for instance, a plurality of discrete actuators corresponding in number to the number of negative stiffness elements 103 (e.g., from two to ten actuators).

In the illustrated embodiment, the adjustable negative stiffness unit cell 100 includes an upper plate 109 stacked on a lower plate 110. Additionally, in the illustrated embodiment, the upper plate 109 includes a flat central portion defining an opening 111 configured to accommodate the central shaft 101 and four arms 112 extending radially outward from the central portion. In the illustrated embodiment, the four arms 112 are equidistantly spaced around the central portion such that adjacent arms 112 are spaced apart by an angle of approximately (about) 90 degrees. In one or more embodiments, the upper plate 109 may include any other suitable number of arms 112, such as, for instance, from two to ten arms. Similarly, in the illustrated embodiment, the lower plate 110 includes a central portion defining an opening 113 configured to accommodate the central shaft 101 and four arms 114 extending radially outward from the central portion. The arms 114 on the lower plate 110 are aligned with the arms 112 on the upper plate 109. Together, the corresponding pairs of arms 112, 114 on the upper and lower plates 109, 110 define the negative stiffness elements 103 (e.g., each of the negative stiffness elements 103 includes one arm 112 on the upper plate 109 and one corresponding arm 114 on the lower plate 110). In one embodiment, the upper and lower plates 109, 110 may be formed from any material having a relatively high elastic strain limit, such as, for instance, fiberglass, titanium, or combinations thereof. In one or more alternate embodiments, the upper and lower plates 109, 110 may be formed out of any other suitable material, such as, for instance, steel, silicon, or combinations thereof.

In the illustrated embodiment, each of the arms 112, 114 of the upper and lower plates 109, 110 are preformed into a curved or contoured shape (e.g., a bell curve or a cosine shape with a single hump). In one or more embodiments, the arms 112, 114 may have any other suitable shape, such as, for instance, flat plates. In one embodiment, the arms 112, 114 may have any other suitable shape after being compressed. The arms 112, 114 of the upper and lower plates 109, 110 in the illustrated embodiments are also curved or contoured in opposite directions (e.g., the arms 112 of the upper plate 109 are curved upward and the arms 114 of the lower plate 110 are curved downward). Accordingly, in the illustrated embodiment, inner and outer ends of the corresponding arms 112, 114 on the upper and lower plates 109, 110 contact each other and intermediate portions of the corresponding arms 112, 114 on the upper and lower plates 109, 110 between the inner and outer ends are spaced apart by a maximum amplitude h, as illustrated in FIG. 1B.

Additionally, in an initial state illustrated in FIG. 1B, the linear distance between the inner ends and the outer ends of the arms 112, 114 has an initial length $L_1$. As illustrated in FIG. 1C, actuating (arrow 107) the one or more actuators 106 is configured to increase the compressive load on the arms 112, 114 by decreasing the distance $L_1$ between the inner ends and the outer ends of the corresponding pairs of arms 112, 114 on the upper and lower plates 109, 110. Additionally, as illustrated in FIG. 1C, increasing the compressive load on the arms 112, 114 increases the maximum amplitude h' between the intermediate portions of the arms 112, 114. In this manner, the one or more actuators 106 are configured to change the mechanical response of the negative stiffness unit cell 100, as described below (i.e., the negative stiffness response of the unit cell 100 may be adjusted by actuating the one or more actuators 106 between the deflated and inflated states).

In the illustrated embodiment, the arms 112, 114 of the upper and lower plates 109, 110 are snap-through beams. Accordingly, each of the negative stiffness elements 103 is configured to "snap" between a first stable position and a second stable position. Within an envelope defined or bounded by these two stable positions, the adjustable negative stiffness unit cell 100 exhibits negative stiffness (i.e., negative stiffness is generated during snap through between the two stable positions). Outside of this envelope bounded by the two stable positions of the negative stiffness elements 103, the adjustable negative stiffness unit cell 100 exhibits positive stiffness. Accordingly, the adjustable negative stiffness unit cell 100 exhibits non-linear stiffness (i.e., the adjustable negative stiffness unit cell 100 exhibits both positive and negative stiffness). For instance, when an upward force is applied to the annular member 102, the adjustable negative stiffness unit cell 100 is configured to initially exhibit a positive stiffness resisting the upward deflection. However, as the force and the magnitude of the upward deflection increase, the adjustable negative stiffness unit cell 100 will reach a snap-through point at which adjustable negative stiffness unit cell 100 will "snap-through" to a stable higher position. During snap through, the adjustable negative stiffness unit cell 100 exhibits negative stiffness (i.e., the adjustable negative stiffness unit cell 100 exhibits an upward force in the direction in which the load was applied to the annular member 102). Similarly, when a downward force is applied to the annular member 102, the adjustable negative stiffness unit cell 100 is initially configured to exhibit a positive stiffness resisting the downward deflection. However, as the force and the magnitude of the downward deflection increase, the adjustable negative stiffness unit cell 100 will reach a snap-through point at which the adjustable negative stiffness unit cell 100 will snap-through to a stable lower position. During snap through, the adjustable negative stiffness unit cell 100 exhibits negative stiffness (i.e., the adjustable negative stiffness unit cell 100 exhibits a downward force in the direction in which the load was applied to the annular member 102). In this manner, the negative stiffness elements 103 are configured to mechanically isolate the central shaft 101 from vibrations in the annular member 102 and/or to mechanically isolate the annular member 102 from vibrations in the central shaft 101. Although in the illustrated embodiment each of the negative stiffness elements 103 includes a pair of compressive snap-through beams, in one or more embodiments, the negative stiffness elements 103 may be any other suitable mechanism exhibiting a negative stiffness mechanical response.

Figure 2:
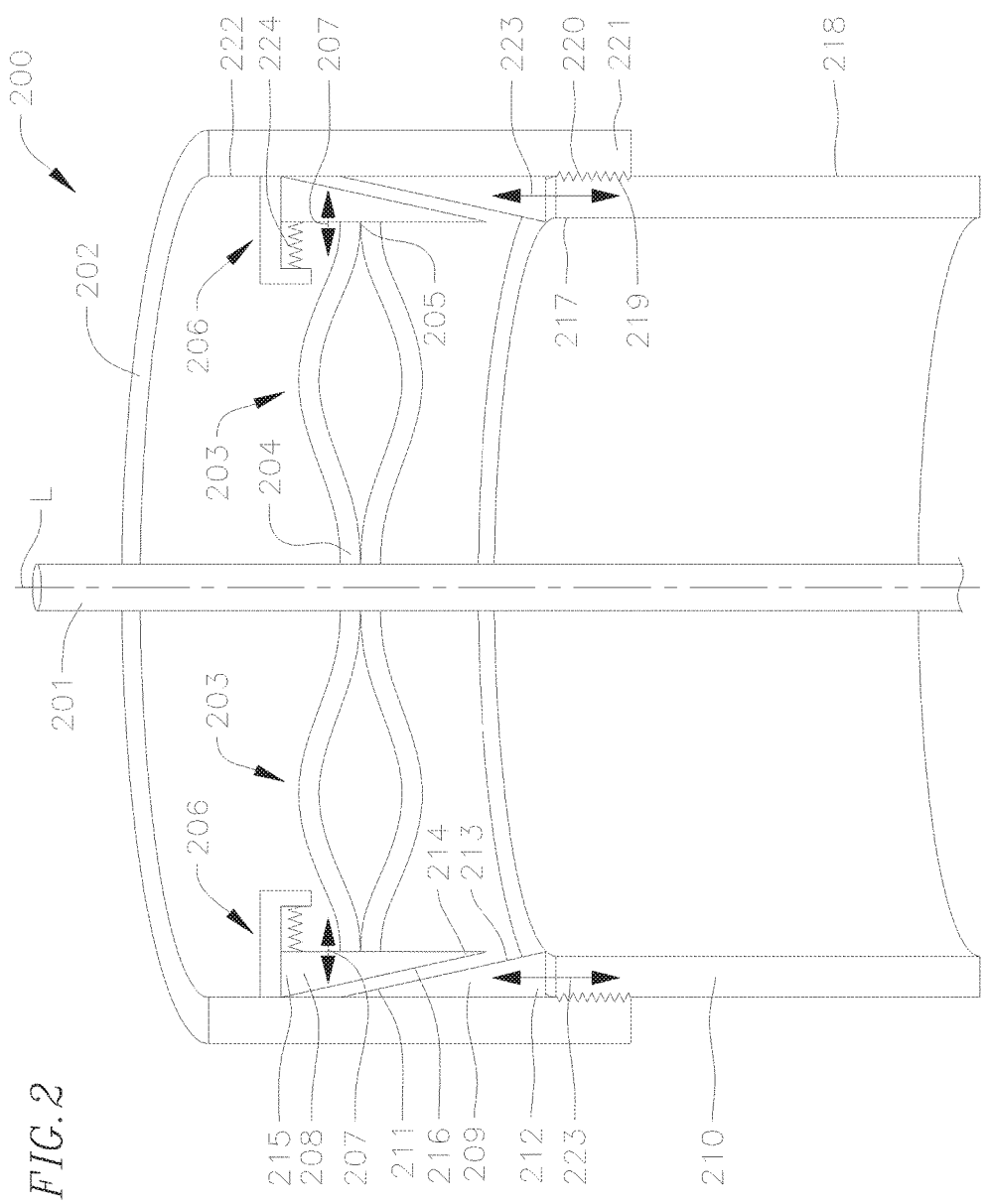
FIG. 2 is a cross-sectional view of an adjustable negative stiffness unit cell according to another embodiment of the present disclosure.

With reference now to FIG. 2, an adjustable negative stiffness unit cell 200 according to another embodiment of the present disclosure includes a central shaft 201 defining a longitudinal axis L, an annular member 202 (e.g., a ring) extending around the central shaft 201, a plurality of negative stiffness elements 203 extending radially outward between the central shaft 201 and the annular member 202. The central shaft 201, the annular member 202, and the negative stiffness elements 203 may be the same or similar to the central shaft 101, the annular member 102, and the negative stiffness elements 103 described above with reference to the embodiment of the adjustable negative stiffness unit cell 100 illustrated in FIGS. 1A-1C. In the illustrated embodiment, each of the plurality of negative stiffness elements 203 includes an inner end 204 fixedly coupled to the central shaft 201 and an outer end 205 proximate the annular member 202. In the illustrated embodiment, the adjustable negative stiffness unit cell 200 includes four negative stiffness elements 203 (two of which are visible in FIG. 2) circumferentially and equidistantly spaced around the central shaft 201, although in one or more embodiments, the adjustable negative stiffness unit cell 200 may include any other suitable number of negative stiffness elements 203, such as, for instance, from two to ten negative stiffness elements. Additionally, in the illustrated embodiment, the negative stiffness unit cell 200 includes at least one actuator assembly 206 coupled to the outer end 205 of each of the negative stiffness elements 203. The actuator assembly 206 is configured to move (arrow 207) between a disengaged position and an engaged position to move the negative stiffness elements 203 between an elongated state (e.g., a relaxed stated) and a compressed state, respectively.

In the embodiment illustrated in FIG. 2, the actuator assembly 206 includes an upper wedge-shaped member 208, a lower wedge-shaped member 209 configured to slidably engage the upper wedge-shaped member 208, and a secondary annular member 210 coupled to the lower wedge-shaped member 209. The lower wedge-shaped member 209 tapers between a narrower upper end 211 and a wider lower end 212, and includes an inwardly facing tapered engagement surface 213. The upper wedge-shaped member 208 tapers between a narrower lower end 214 and a wider upper end 215, and includes an outwardly facing tapered engagement surface 216. The inwardly facing tapered engagement surface 213 on the lower wedge-shaped member 209 is configured to engage a corresponding outwardly facing tapered engagement surface 216 on the upper wedge-shaped member 208.

Additionally, in the embodiment illustrated in FIG. 2, the secondary annular member 210 is at least partially housed between the outer annular member 202 and the central shaft 201. In the illustrated embodiment, an upper end 217 of an outer surface 218 of the secondary annular member 210 includes external threads 219 configured to engage internal threads 220 on a lower end 221 of an inner surface 222 of the outer annular member 202. As the secondary annular member 210 is threaded upward (arrow 223) into the outer annular member 202, the lower wedge-shaped member 209 is forced upward. As the lower wedge-shaped member 209 is forced upward by the secondary annular member 210, the inwardly facing tapered engagement surface 213 on the lower wedge-shaped member 209 engages the outwardly facing tapered engagement surface 216 on the upper wedge-shaped member 208 and forces the upper wedge-shaped member 208 radially inward (arrow 207). The radially inward movement (arrow 207) of the upper wedge-shaped member 208 compresses the negative stiffness elements 203 to adjust the mechanical response of the adjustable negative stiffness unit cell 200.

As the secondary annular member 210 is unthreaded from the outer annular member 202, the force imparted on the outwardly facing tapered engagement surface 216 on the upper wedge-shaped member 208 by the inwardly facing tapered engagement surface 213 on the lower wedge-shaped member 209 is lessened (e.g., the inwardly facing tapered engagement surface 213 on the lower wedge-shaped member 209 disengages the outwardly facing tapered engagement surface 216 on the upper wedge-shaped member 208) and the upper wedge-shaped member 208 is permitted to move radially outward (arrow 207). Additionally, in the illustrated embodiment, the actuator assembly 206 includes a biasing mechanism 224 (e.g., a spring) configured to move the upper wedge-shaped member radially outward (arrow 207) as the secondary annular member 210 is unthreaded from the outer annular member 202. As the upper wedge-shaped member moves radially outward (arrow 207), the negative stiffness elements 203 elongate to adjust the mechanical response of the adjustable negative stiffness unit cell 200. The secondary annular member 210 may be adjusted (e.g., threaded and unthreaded) either manually or automatically (e.g., by a motor). Additionally, although in the illustrated embodiment the secondary annular member 210 is threadedly coupled to the outer annular member 202, in one or more embodiments, the secondary annular member 210 may be coupled to the outer annular member 202 by any other suitable mechanism, such as, for instance, with one or more guides or rails.

Although in the illustrated embodiment the negative stiffness unit cell 200 includes a single upper wedge-shaped member 208 extending continuously or substantially continuously around an inner periphery of the outer annular member 202 and a single lower wedge-shaped member 209 extending continuously or substantially continuously around the inner periphery of the outer annular member 202 (i.e., a single pair of upper and lower wedge-shaped members 208, 209), in one or more embodiments, the negative stiffness unit cell 200 may include any other suitable number of pairs of upper and lower wedge-shaped members 208, 209, such as, for instance, a plurality of discrete upper and lower wedge-shaped members corresponding in number to the number of negative stiffness elements 203 (e.g., from two to ten pairs of upper and lower wedge-shaped members).

Figure 3A:
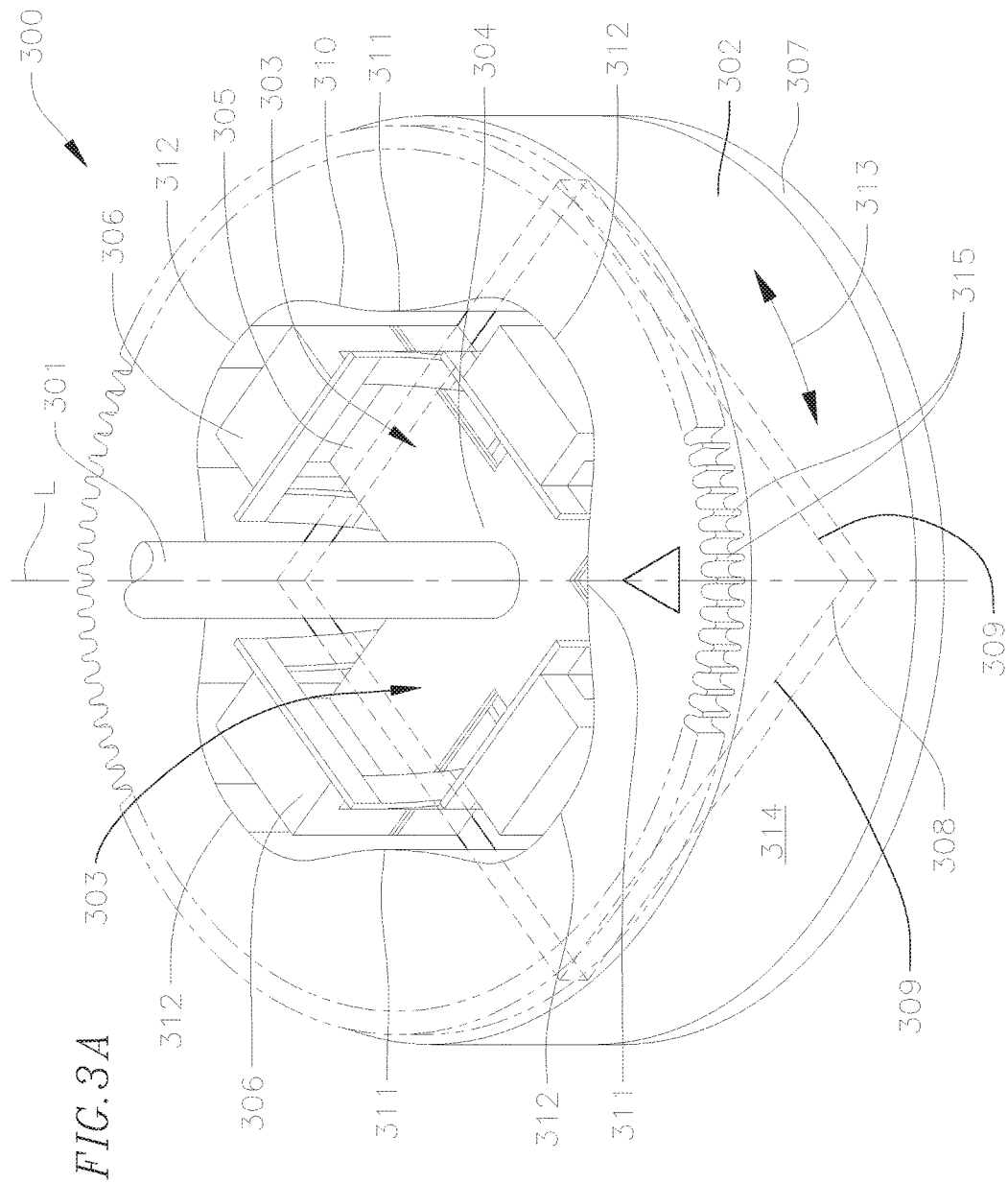
FIGS. 3A and 3B are perspective views of an adjustable negative stiffness unit cell according to one embodiment of the present disclosure in an expanded position and a compressed position, respectively.
Figure 3B:
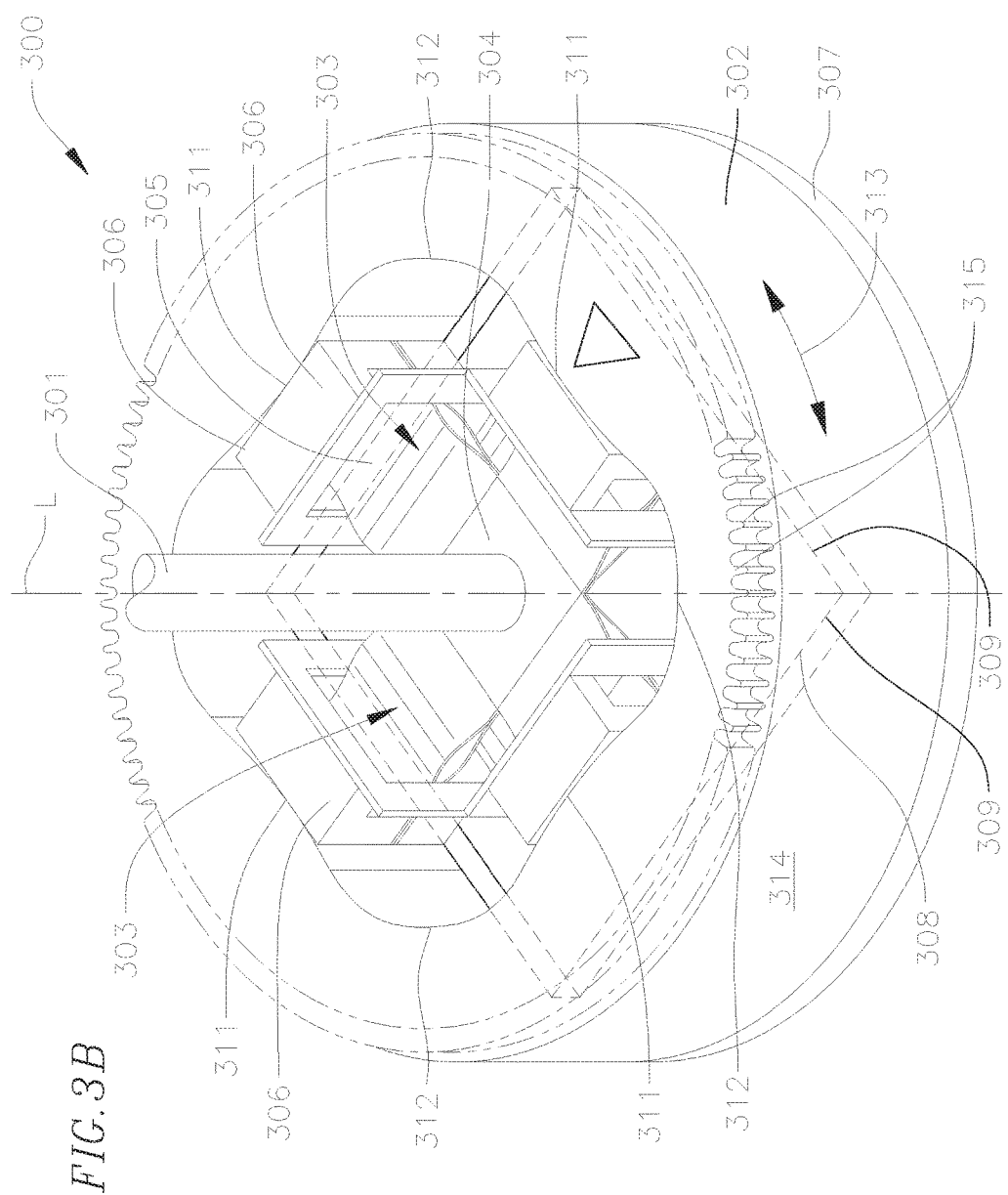

With reference now to FIGS. 3A and 3B, an adjustable negative stiffness unit cell 300 according to another embodiment includes a central shaft 301 defining a longitudinal axis L, an annular member 302 extending around the central shaft 301, a plurality of negative stiffness elements 303 extending radially outward between the central shaft 301 and the annular member 302. The central shaft 301 and the negative stiffness elements 303 may be the same or similar to the central shaft 101 and the negative stiffness elements 103 described above with reference to the embodiment of the adjustable negative stiffness unit cell 100 illustrated in FIGS. 1A-1C. In the illustrated embodiment, each of the plurality of negative stiffness elements 303 includes an inner end 304 fixedly coupled to the central shaft 301 and an outer end 305 proximate the annular member 302. In the illustrated embodiment, the adjustable negative stiffness unit cell 300 includes four negative stiffness elements 303 circumferentially and equidistantly spaced around the central shaft 301, although in one or more embodiments, the adjustable negative stiffness unit cell 300 may include any other suitable number of negative stiffness elements 303, such as, for instance, from two to ten negative stiffness elements.

Additionally, in the illustrated embodiments, the adjustable negative stiffness unit cell 300 includes a flexure 306 coupled to the outer end 305 of each of the negative stiffness elements 303. The flexures 306 permit movement of the outer ends 305 of the negative stiffness elements 303 in a first direction, but prevent movement of the outer ends 305 of the negative stiffness elements 303 in a second direction perpendicular to the first direction. In the illustrated embodiment, the flexures 306 are configured to permit movement of the outer ends 305 of the negative stiffness elements 303 in a plane perpendicular to the longitudinal axis L of the central shaft 301 and are configured to prevent movement of the outer ends 305 of the negative stiffness elements 303 in a plane parallel to the longitudinal axis L of the central shaft 301. For instance, in one embodiment, the flexures 306 are configured to permit horizontal movement of the outer ends 305 of the negative stiffness elements 303, but prevent vertical movement of the outer ends 305 of the negative stiffness elements 303.

In the illustrated embodiment, the adjustable negative stiffness unit cell 300 also includes a base plate 307. In the illustrated embodiment, the outer annular member 302 is supported on the base plate 307. The base plate 307 defines an opening 308 configured to accommodate the flexures 306. In the illustrated embodiment, the flexures 306 are coupled to interior edges 309 of the base plate 307 defining the opening 308. Although in the illustrated embodiment the opening 308 is square such that the base plate 307 includes four interior edges 309, in one or more embodiments, the opening 308 may have any other suitable shape (e.g., hexagonal, octagonal, or decagonal), depending, for instance, on the number of flexures 306 and the number of negative stiffness elements 303. Additionally, in one or more embodiments, the number of interior edges 309 defining the opening 308 in the base plate 307 corresponds to the number of flexures 306 and the number of negative stiffness elements 303.

Additionally, in the illustrated embodiment, the outer annular member 302 includes an inner cam surface 310. In the illustrated embodiment, the inner cam surface 310 on the outer annular member 302 includes a series of peaks 311 and a series of recesses or wells 312 alternately arranged (e.g., the inner cam surface 310 includes a recess 312 between adjacent peaks 311). The number of peaks 311 and the number of recesses 312 on the inner cam surface 310 correspond to the number of flexures 306 and the number of negative stiffness elements 303. As illustrated in FIG. 3A, when the recesses 312 are aligned with the flexures 306 and the outer ends 305 of the negative stiffness elements 303, the negative stiffness elements 303 are in an elongated state (e.g. an uncompressed state). As the outer annular member 302 rotates (arrow 313), the recesses 312 are moved out of alignment with the flexures 306 and the outer ends 305 of the negative stiffness elements 303, and the peaks 311 are advanced toward the flexures 306 and the outer ends 305 of the negative stiffness elements 303. As illustrated in FIG. 3B, when the peaks 311 are aligned with the flexures 306 and the outer ends 305 of the negative stiffness elements 303, the negative stiffness elements 303 are in a compressed (e.g., buckled) state. In this manner, the outer annular member 302 may be rotated (arrow 313) to adjust the mechanical response of the adjustable negative stiffness unit cell 300 (e.g., the outer annular member 302 is configured to function as an actuator configured to compress and elongate (e.g., relax) the negative stiffness elements 303 to adjust the mechanical response of the adjustable negative stiffness unit cell 300). Although in the illustrated embodiment the recesses 312 are symmetric, in one or more embodiments, the recesses 312 may not be symmetric (i.e., the recesses 312 may be asymmetric). For example, in one or more embodiments, to improve performance, the recesses 312 may include notches and/or detents or other features (e.g., depressions or protrusions) to make certain angular positions more stable. Additionally, in one or more embodiments, if rotation (arrow 313) proceeds in one direction only (e.g., clockwise or counterclockwise only), the recesses 312 may have a shallow slope during compression and steep slope during relaxation of the negative stiffness elements 303, in order to increase the release speed and increase the mechanical advantage of the outer annular member 302 over the negative stiffness elements 303.

Additionally, in the illustrated embodiment, an outer surface 314 of the outer annular member 302 includes a plurality of teeth 315 (e.g., the outer surface 314 of the outer annular member 302 is geared). The teeth 315 are configured to facilitate rotating (arrow 313) the outer annular member 302 (e.g., with a belt or a chain driven by a motor). In one or more embodiments, the outer annular member 302 may include any other suitable mechanism configured to facilitate rotation (arrow 313) of the outer annular member 302. Additionally, the outer annular member 302 may be rotated either manually or automatically (e.g., with a motor).

Figure 4A:
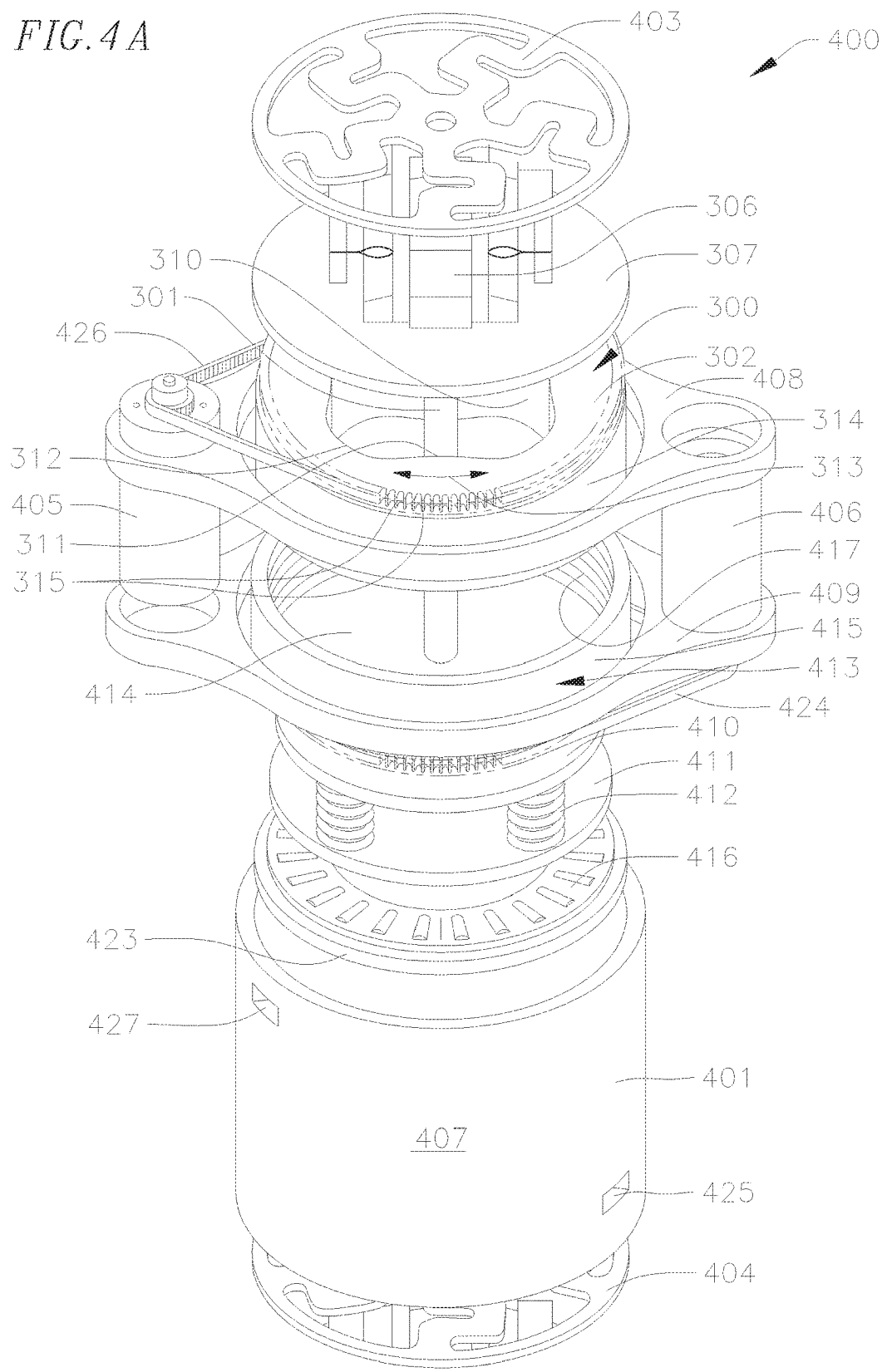
FIGS. 4A and 4B are an exploded perspective view and a cutaway perspective view, respectively, of an adjustable negative stiffness mechanism according to an embodiment of the present disclosure incorporating the embodiment of the adjustable negative stiffness unit cell illustrated in FIGS. 3A and 3B.
Figure 4B:
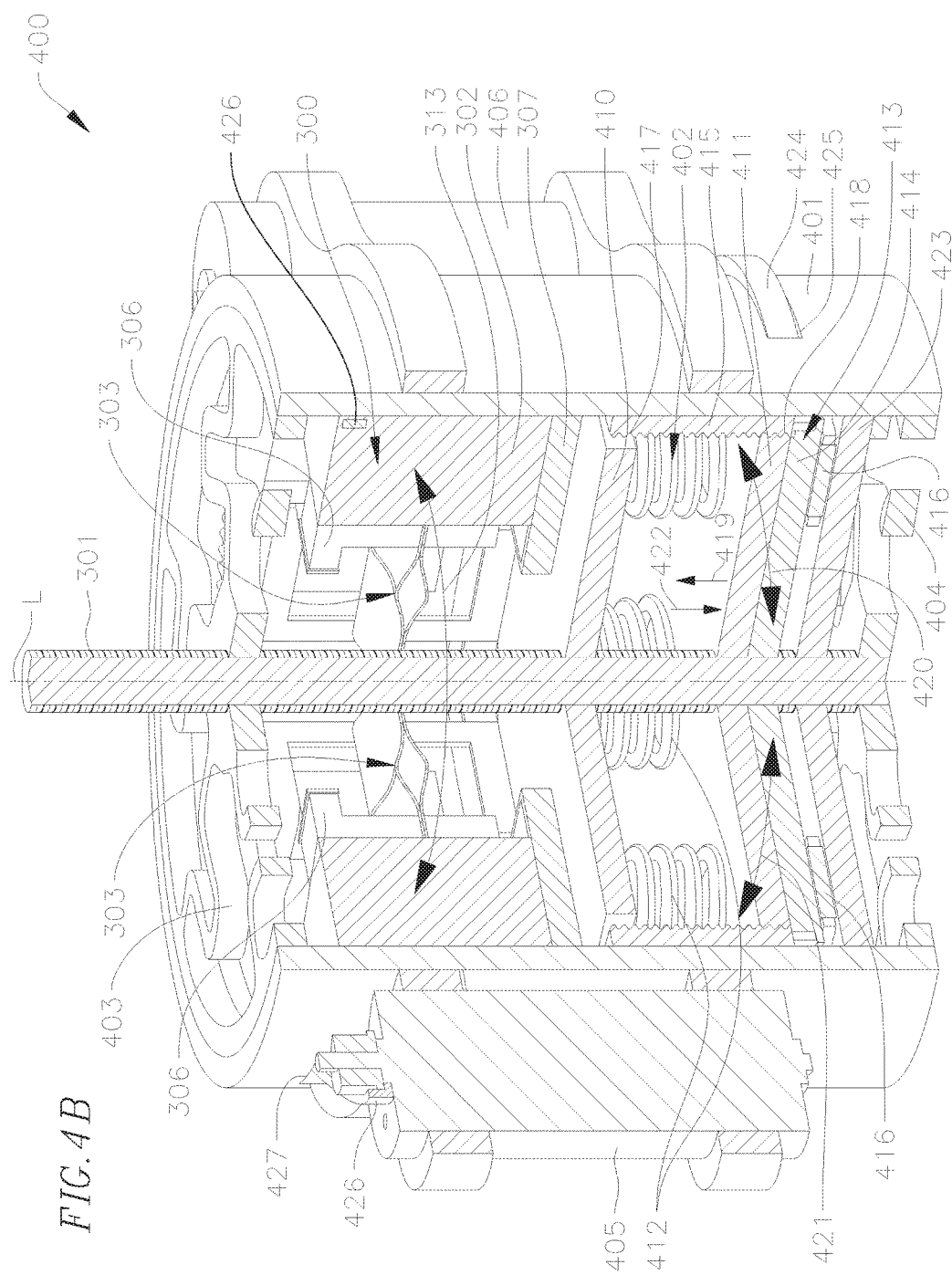

With reference now to FIGS. 4A and 4B, an adjustable negative stiffness mechanism 400 according to one embodiment of the present disclosure incorporates the embodiment of the adjustable negative stiffness unit cell 300 illustrated in FIGS. 3A and 3B. In the embodiment illustrated in FIGS. 4A and 4B, the adjustable negative stiffness mechanism 400 includes a containment vessel 401, a positive-stiffness spring assembly 402, upper and lower ortho-planar springs 403, 404, respectively, and a pair of rotary motors 405, 406. The containment vessel 401 is configured to house the adjustable negative stiffness unit cell 300, the positive-stiffness spring assembly 402, and the upper and lower ortho-planar springs 403, 404. In the illustrated embodiment, the base plate 307 of the adjustable negative stiffness unit cell 300 is fixedly coupled to the containment vessel 401 and the outer annular member 302 of the adjustable negative stiffness unit cell 300 is rotatable (arrow 313) within the containment vessel 401. Additionally, in the illustrated embodiment, the rotary motors 405, 406 are configured to be mounted to an exterior surface 407 of the containment vessel 401 by a pair of support arms 408, 409.

Still referring to the embodiment illustrated in FIGS. 4A and 4B, the positive-stiffness spring assembly 402 includes a top plate 410 fixedly coupled to the central shaft 301, a bottom plate 411 slidably coupled to the central shaft 301, and a series of coil springs 412 extending between the bottom plate 411 and the top plate 410. In one or more embodiments, the positive-stiffness spring assembly 402 may include any other suitable number of coil springs 412, such as, for instance, a single coil spring.

Additionally, in the illustrated embodiment, the positive-stiffness spring assembly 402 also includes a spring container 413 that is configured to house the top and bottom plates 410, 411 and the coil springs 412. The spring container 413 includes a base wall 414 below the bottom plate 411 and a sidewall 415 extending up from the base wall 414. When the adjustable negative stiffness mechanism 400 is assembled, as illustrated in FIG. 4B, the spring container 413 is rotatably supported on thrust bearings 416. Additionally, in the illustrated embodiment, the sidewall 415 of the spring container 413 contains internal threads 417. The internal threads 417 on the sidewall 415 of the spring container 413 are configured to engage external threads 418 on an outer surface of the bottom plate 411. The engagement between the internal threads 417 on the sidewall 415 of the spring container 413 and the external threads 418 on the bottom plate 411 is configured to facilitate moving (arrow 419) the bottom plate 411 up and down along the central shaft 301. For instance, in one embodiment, when the spring container 413 is rotated (arrow 420) in a first direction, the threaded engagement between the sidewall 415 of the spring container 413 and the bottom plate 411 causes the bottom plate 411 to move (arrow 419) up along the central shaft 301 toward the top plate 410. As the bottom plate 411 moves (arrow 419) up toward the top plate 410, the coil springs 412 are compressed between the top plate 410 and the bottom plate 411, which increases the average force output of the adjustable negative stiffness mechanism 400. When the spring container 413 is rotated (arrow 421) in a second direction opposite the first direction (arrow 420), the threaded engagement between the sidewall 415 of the spring container 413 and the bottom plate 411 causes the bottom plate 411 to move (arrow 422) down along the central shaft 301 away from the top plate 410. As the bottom plate 411 moves (arrow 422) down away from the top plate 410, the coil springs 412 are expanded or elongated, which decreases the average force output of the adjustable negative stiffness mechanism 400. In this manner, the average force of the adjustable negative stiffness mechanism 400 may be adjusted by rotating the spring container 413 in the suitable direction (arrow 420 or arrow 421) for the purpose of, for example, supporting an object with a different mass.

Additionally, in the illustrated embodiment, the positive-stiffness spring assembly 402 also includes a grounding plate 423 below the base wall 414 of the spring container 413. The grounding plate 423 is fixedly coupled to the containment vessel 401. The grounding plate 423 supports the thrust bearings 416.

Still referring to the embodiment illustrated in FIGS. 4A and 4B, one of the rotary motors 406 is coupled to the spring container 413 by a belt or chain 424. In one or more embodiments, an exterior surface of the spring container 413 may include teeth (e.g., the exterior surface of the spring container 413 may be geared) to facilitate engagement of the spring container 413 by the belt or chain 424. Accordingly, the rotary motor 406 is configured to drive the belt or chain 406 to rotate (arrows 420, 421) the spring container 413 in the desired direction to achieve the desired positive stiffness of the adjustable negative stiffness mechanism 400. Additionally, in the illustrated embodiment, the containment vessel 401 defines a pair of openings 425 (one opening visible in FIG. 4A) configured to receive the belt or chain 424 coupled to the rotary motor 406. In the illustrated embodiment, the belt or chain 424 extends from the rotary motor 406 coupled to the exterior surface 407 of the containment vessel 401, in through one of the openings 425 in the containment vessel 401, around the spring container 413, and out through the other opening in the containment vessel 401 back to the rotary motor 406. In one or more alternate embodiments, the spring container 413 may be configured to be rotated manually. In loading configurations where negative reaction forces are required (e.g., surviving a "flipped" orientation which reverses gravity), it may be desirable to prevent the compression springs 412 from "lifting off" and losing contact with the plates 410, 411. Accordingly, in one or more embodiments, ends of the springs 412 may be bonded or otherwise retained to the plates 410, 411, the compression springs 412 (e.g., coil springs) may be replaced with ortho-planar springs, or the interface between the springs 412 and the plates 410, 411 may be modified to include a pair of antagonistic compression springs which always maintain contact with the plates 410, 411.

With continued reference to the embodiment illustrated in FIGS. 4A and 4B, the other rotary motor 405 coupled to the exterior surface 407 of the containment vessel 401 is coupled to a chain or belt 426 configured to engage the teeth 315 on the outer surface 314 of the outer annular member 302. In the illustrated embodiment, the containment vessel 401 defines a pair of openings 427 (one visible in FIG. 4A) configured to receive the belt or chain 426 coupled to the rotary motor 405. In the illustrated embodiment, the belt or chain 426 extends from the rotary motor 405 coupled to the exterior surface 407 of the containment vessel 401, in through one of the openings 427 in the containment vessel 401, around the outer annular member 302 of the adjustable negative stiffness unit cell 300, and out through the other opening in the containment vessel 401 back to the rotary motor 405. Accordingly, the rotary motor 405 is configured to drive the belt or chain 427 to rotate (arrow 313) the outer annular member 302 such that the recesses 312 or the peaks 311 on the inner cam surface 310 of the outer annular member 302 are aligned with the negative stiffness elements 303. As described above with reference to the embodiment of the adjustable negative stiffness unit cell 300 illustrated in FIG. 3A, when the recesses 312 are aligned with the outer ends 305 of the negative stiffness elements 303, the negative stiffness elements 303 are in an elongated state (e.g. an uncompressed state). As described above with reference to the embodiment of the adjustable negative stiffness unit cell 300 illustrated in FIG. 3B, when the peaks 311 are aligned with the negative stiffness elements 303, the negative stiffness elements 303 are in a compressed (e.g., buckled) state. In this manner, the negative stiffness of the adjustable negative stiffness mechanism 400 may be adjusted by rotating (arrow 313) the outer annular member 302. In one or more alternate embodiments, the outer annular member 302 may be configured to be rotated manually.

Additionally, in the embodiment illustrated in FIGS. 4A and 4B, the upper and lower ortho-planar springs 403, 404, respectively, extend between the central shaft 301 and the containment vessel 401. Additionally, in the illustrated embodiment, the ortho-planar springs 403, 404 are fixedly coupled to the central shaft 301. Accordingly, the upper and lower ortho-planar springs 403, 404 are configured to reduce motion of the central shaft 301 in a direction other than along the longitudinal axis L of the central shaft 301. In one or more embodiments, the ortho-planar springs 403, 404 may be configured to supply positive stiffness to the adjustable negative stiffness mechanism 400 in a direction of the longitudinal axis L of the central shaft 301. Additionally, in one or more embodiments, the position of the ortho-planar springs 403, 404 relative to the containment vessel 401 may be adjustable to adjust the magnitude of the positive stiffness supplied by the ortho-planar springs 403, 404. In one or more embodiments in which the ortho-planar springs 403, 404 are configured to provide positive stiffness to the adjustable negative stiffness mechanism 400 in a direction of the longitudinal axis L of the central shaft 301, the adjustable negative stiffness mechanism 400 may be provided without the positive-stiffness spring assembly 402.

Accordingly, in the embodiment of the adjustable negative stiffness mechanism 400 illustrated in FIGS. 4A and 4B, the central shaft 301 is mechanically isolated from vibrations in the containment vessel 401 and the containment vessel 401 is mechanically isolated from vibrations in the central shaft 301 due to the negative stiffness elements 303 in the adjustable negative stiffness unit cell 300, the upper and lower ortho-planar springs 403, 404, and the positive stiffness coil springs 412 of the positive-stiffness spring assembly 402.

With reference now to FIGS. 5A-5D, an adjustable negative stiffness unit cell 500 according to another embodiment of the present disclosure includes a central shaft 501 defining a longitudinal axis L, an annular member 502 extending around the central shaft 501, a plurality of negative stiffness elements 503 extending radially outward between the central shaft 501 and the annular member 502. The central shaft 501 and the negative stiffness elements 503 may be the same or similar to the central shaft 101 and the negative stiffness elements 103 described above with reference to the embodiment of the adjustable negative stiffness unit cell 100 illustrated in FIGS. 1A-1C. In the illustrated embodiment, each of the negative stiffness elements 103 includes a pair of upper and lower legs 504, 505. In the illustrated embodiment, each of the negative stiffness elements 503 includes an inner end 506 fixedly coupled to the central shaft 501 and an outer end 507 slidably coupled to the annular member 502. In the illustrated embodiment, the adjustable negative stiffness unit cell 500 includes four negative stiffness elements 503 circumferentially and equidistantly spaced around the central shaft 501, although in one or more embodiments, the adjustable negative stiffness unit cell 500 may include any other suitable number of negative stiffness elements 503, such as, for instance, from two to ten negative stiffness elements.

Figure 5A:
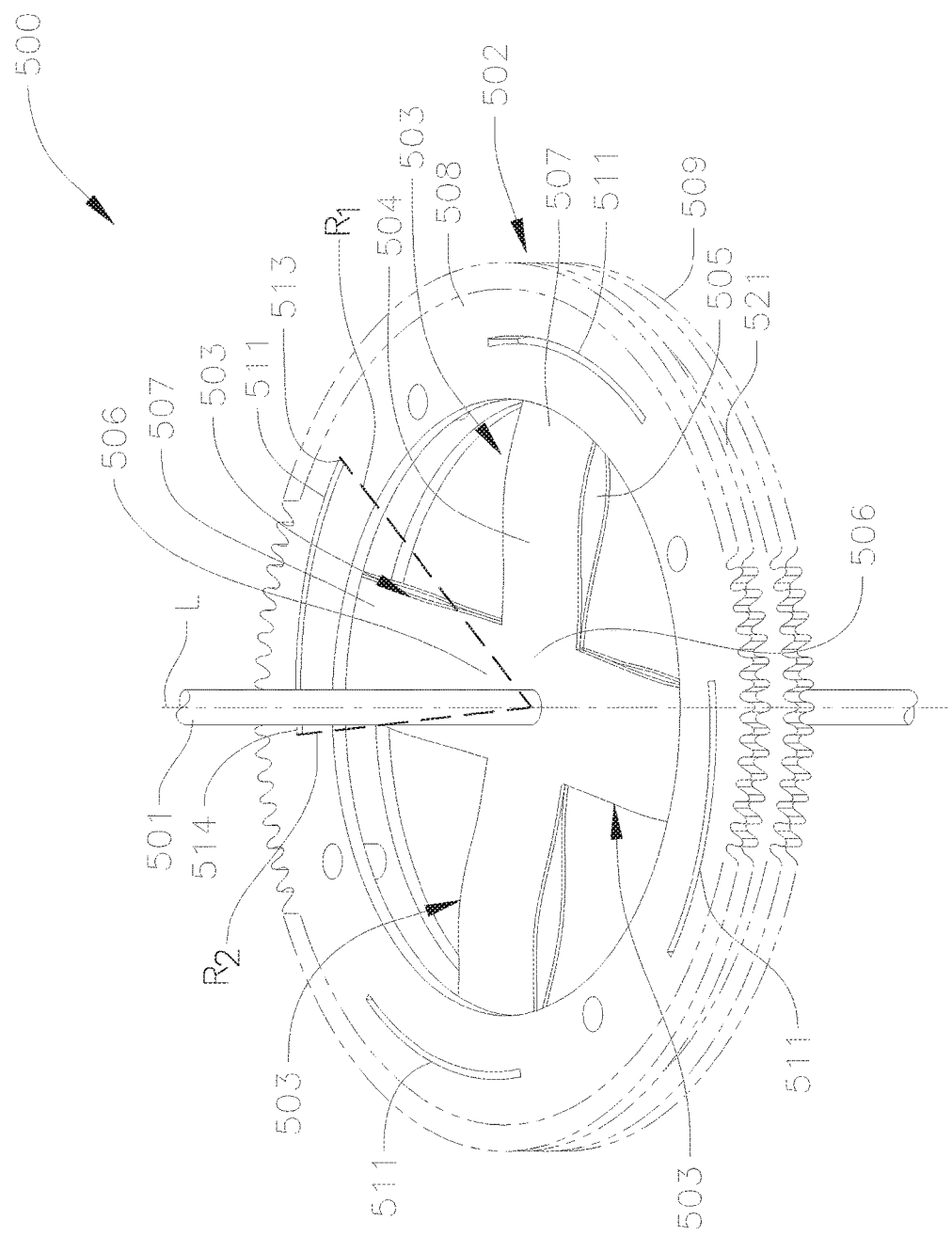
FIGS. 5A and 5B are a perspective view and an exploded perspective view, respectively, of an adjustable negative stiffness unit cell according to another embodiment of the present disclosure.
Figure 5B:
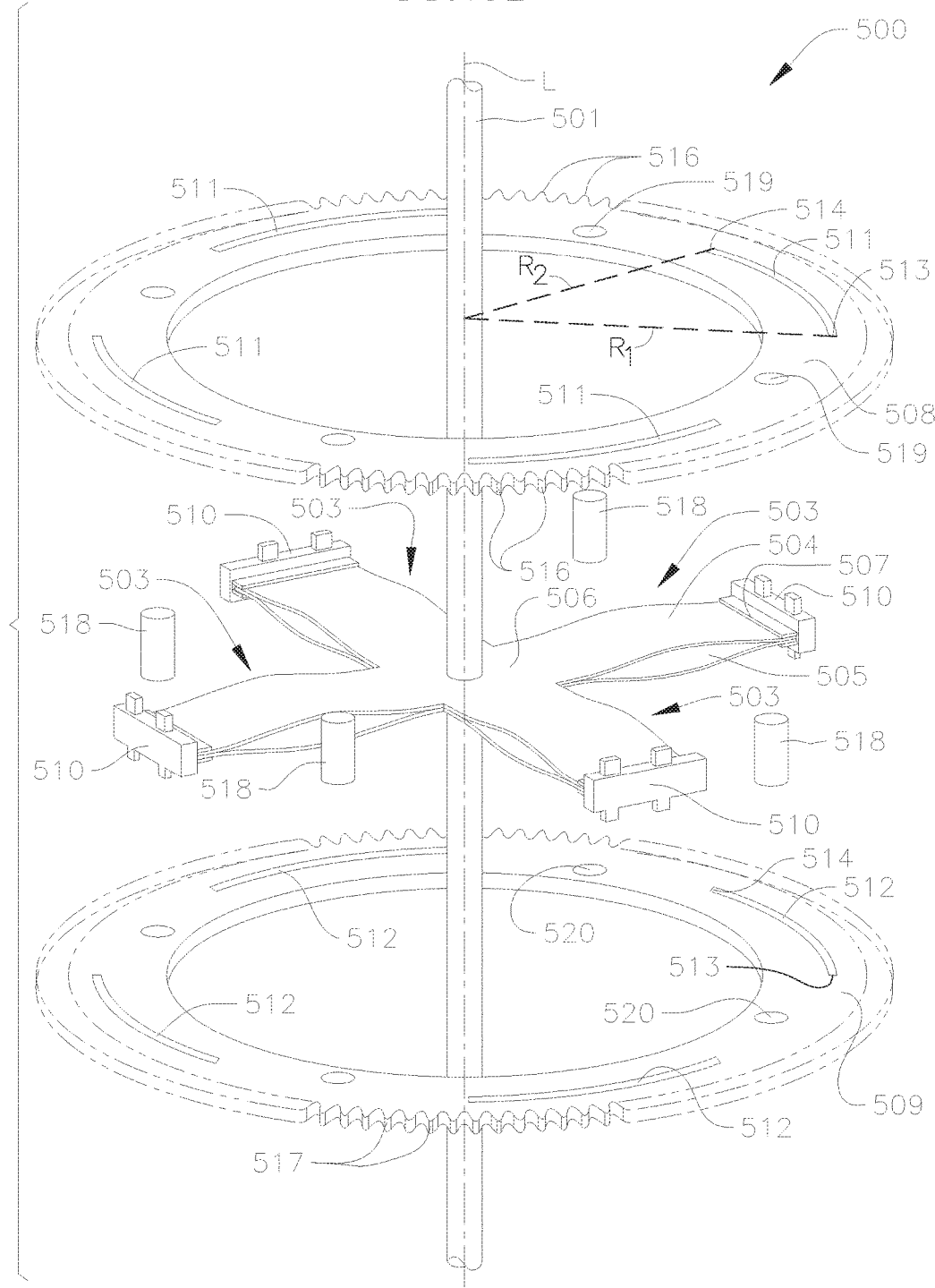

In the embodiment illustrated in FIGS. 5A-5B, the annular member 502 includes an upper gear plate 508 aligned with a lower gear plate 509 aligned with the upper gear plate 508. In the illustrated embodiment, the outer ends 507 of the negative stiffness elements 503 are disposed between the upper and lower gear plates 508, 509. Additionally, in the illustrated embodiment, the adjustable negative stiffness unit cell 500 includes a clamp 510 coupled to the outer end 507 of each of the negative stiffness elements 503. In the illustrated embodiment, each of the clamps 510 is configured to couple an outer end of each upper leg 504 to an outer end of the corresponding lower leg 505.

Additionally, in the embodiment illustrated in FIGS. 5A-5D, the upper and lower gear plates 508, 509 define a series of grooves or tracks 511, 512, respectively. The tracks 511 in the upper gear plate 508 are aligned with the tracks 512 in the lower gear plate 509. The number of tracks 511, 512 in each of the upper and lower gear plates 508, 509 corresponds to the number of negative stiffness elements 503. In the illustrated embodiment, each of the tracks 511, 512 has a first end 513 spaced apart from the longitudinal axis L by a first radial distance $R_1$ and a second end 514 spaced apart from the longitudinal axis L by a second radial distance $R_2$ less than the first radial distance $R_1$. In the illustrated embodiment, each of the tracks 511, 512 has a continually decreasing radius between the first and second ends 513, 514. Accordingly, in the illustrated embodiment, each of the tracks 511, 512 is a spiral segment.

Figures 5C, 5D:
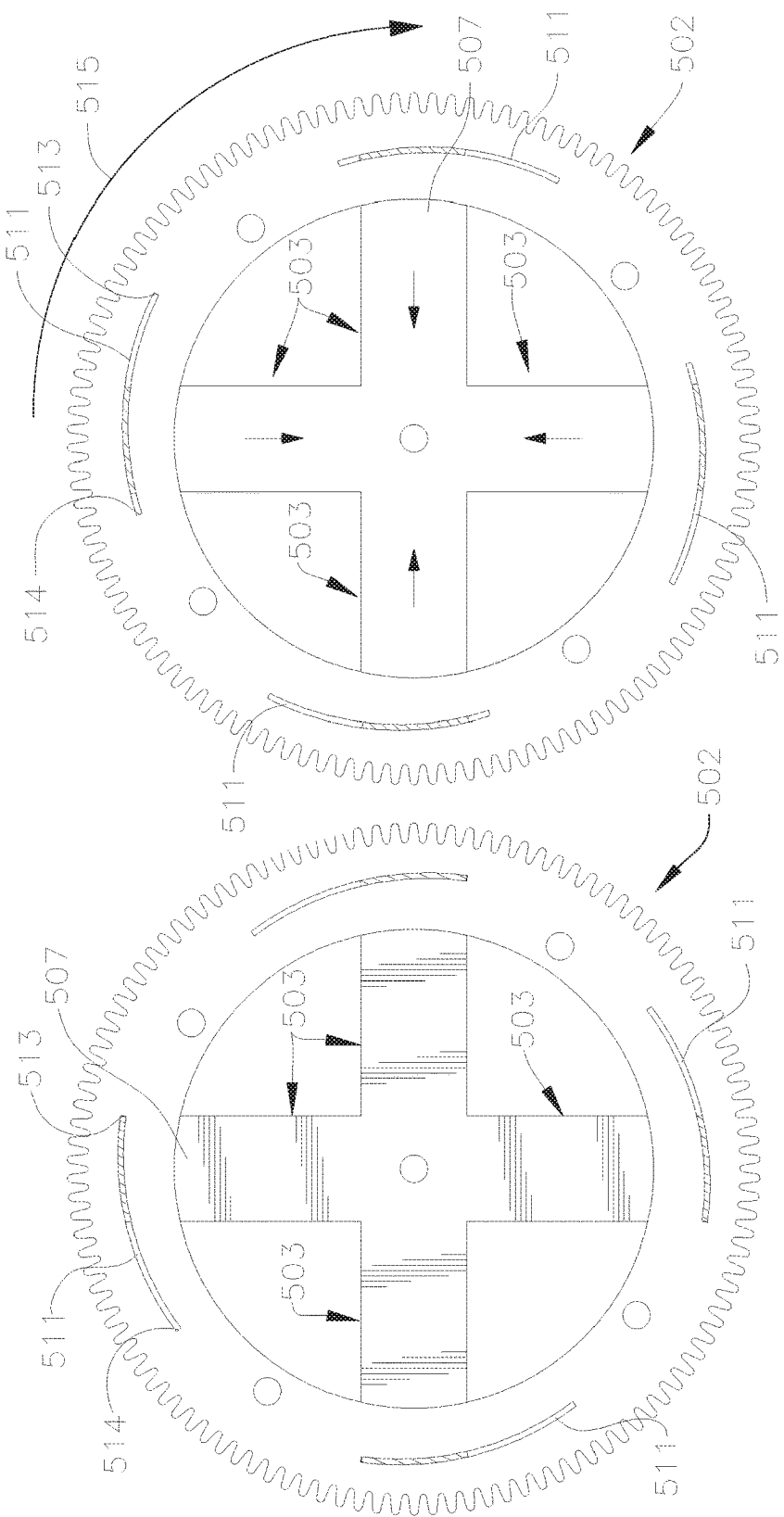

Additionally, in the illustrated embodiment, a portion of each of the clamps 510 is slidably received in one of the pairs of tracks 511, 512. As illustrated in FIG. 5C, when the clamps 510 are positioned at the first ends 513 of the tracks 511, 512, the negative stiffness elements 503 are in an elongated or a relaxed state (e.g., an uncompressed state). In one embodiment, when the negative stiffness elements 503 are in the relaxed state, the negative stiffness elements exhibit beam bending behavior. As the outer annular member 502 (e.g., the upper and lower gear plates 508, 509) is rotated (arrow 515), the clamps 510 and the outer ends 507 of the negative stiffness elements 503 slide along the pairs of tracks 511, 512 and are advanced toward the second ends 514 of the tracks 511, 512. As illustrated in FIG. 5D, when the clamps 510 and the outer ends 507 of the negative stiffness elements 503 are positioned at the second ends 514 of the tracks 511, 512, the negative stiffness elements 503 are in a compressed (e.g., buckled) state due to the shorter radial distance $R_2$ between the second ends 514 of the tracks 511, 512 and the longitudinal axis L of the central shaft 501 than the radial distance $R_1$ between the first ends 513 of the tracks 511, 512 and the longitudinal axis L of the central shaft 301. Additionally, the rotation (arrow 515) of the outer annular member 502 is configured to synchronously and uniformly compress and relax each of the negative stiffness elements 503. When the negative stiffness elements 503 are in the compressed (e.g., buckled) state (see FIG. 5D), the negative stiffness elements 503 exhibit buckled beam behavior, which exhibits negative stiffness. In this manner, the outer annular member 502 (e.g., the upper and lower gear plates 508, 509) may be rotated (arrow 515) to adjust the mechanical response of the adjustable negative stiffness unit cell 500.

Additionally, in the illustrated embodiment, outer surfaces of the upper and lower gear plates 508, 509 include a series of teeth 516, 517, respectively, (e.g., the outer surfaces of the upper and lower gear plates 508, 509 are geared). The teeth 516, 517 are configured to facilitate rotating the upper and lower gear plates 508, 509, such as, for instance, by a belt or a chain driven by a motor and engaging the teeth 516, 517. In one or more embodiments, the outer annular member 502 (e.g., the upper and lower gear plates 508, 509) may include any other suitable mechanism configured to facilitate rotating (arrow 515) the upper and lower gear plates 508, 509 relative to the negative stiffness elements 503. Additionally, the outer annular member 502 may be rotated either manually or automatically (e.g., with a motor).

Additionally, as illustrated in FIG. 5B, the adjustable negative stiffness unit cell 500 also includes a series of spacers 518 configured to space the upper gear plate 508 apart from the lower gear plate 509. Upper ends of the spacers 518 are received in openings 519 in the upper gear plate 508 and lower ends of the spacers 518 are received in corresponding openings 520 in the lower gear plate 509. The spacers 518 are configured to maintain a gap 521 (see FIG. 5A) between the upper and lower gear plates 508, 509 to enable the clamps 510 and the outer ends 507 of the negative stiffness elements 503 to slide within the tracks 511, 512. Otherwise, friction caused by clamping the outer ends 507 of the negative stiffness elements 503 between the upper and lower gear plates 508, 509 may prevent or inhibit the upper and lower gear plates 508, 509 from rotating (arrow 515) relative to the negative stiffness elements 503.

Figure 6A:
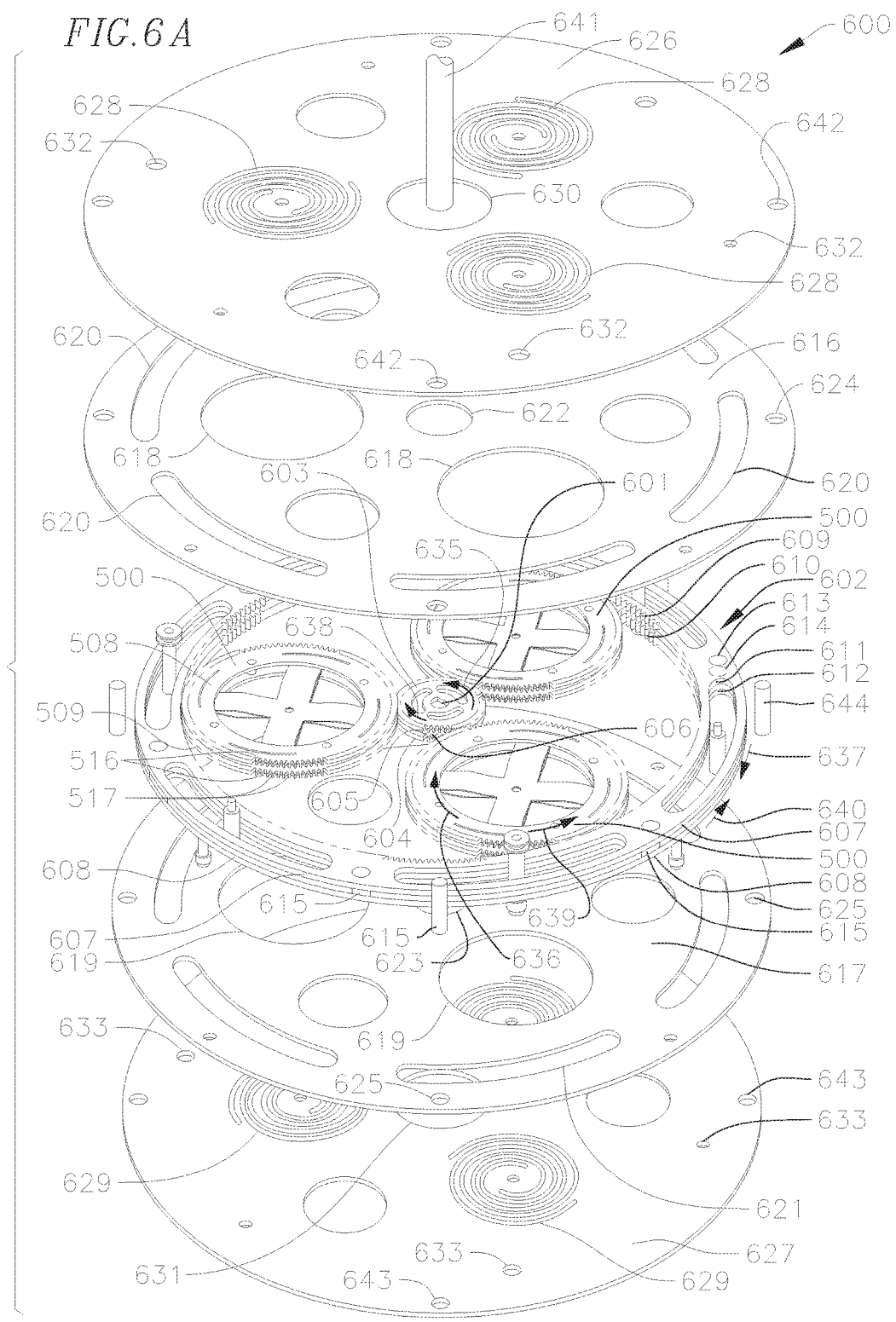
FIGS. 6A and 6B are a perspective view and an exploded perspective view, respectively, of an adjustable negative stiffness mechanism according to another embodiment of the present disclosure incorporating a plurality of the adjustable negative stiffness unit cells illustrated in FIGS. 5A-5D.
Figure 6B:
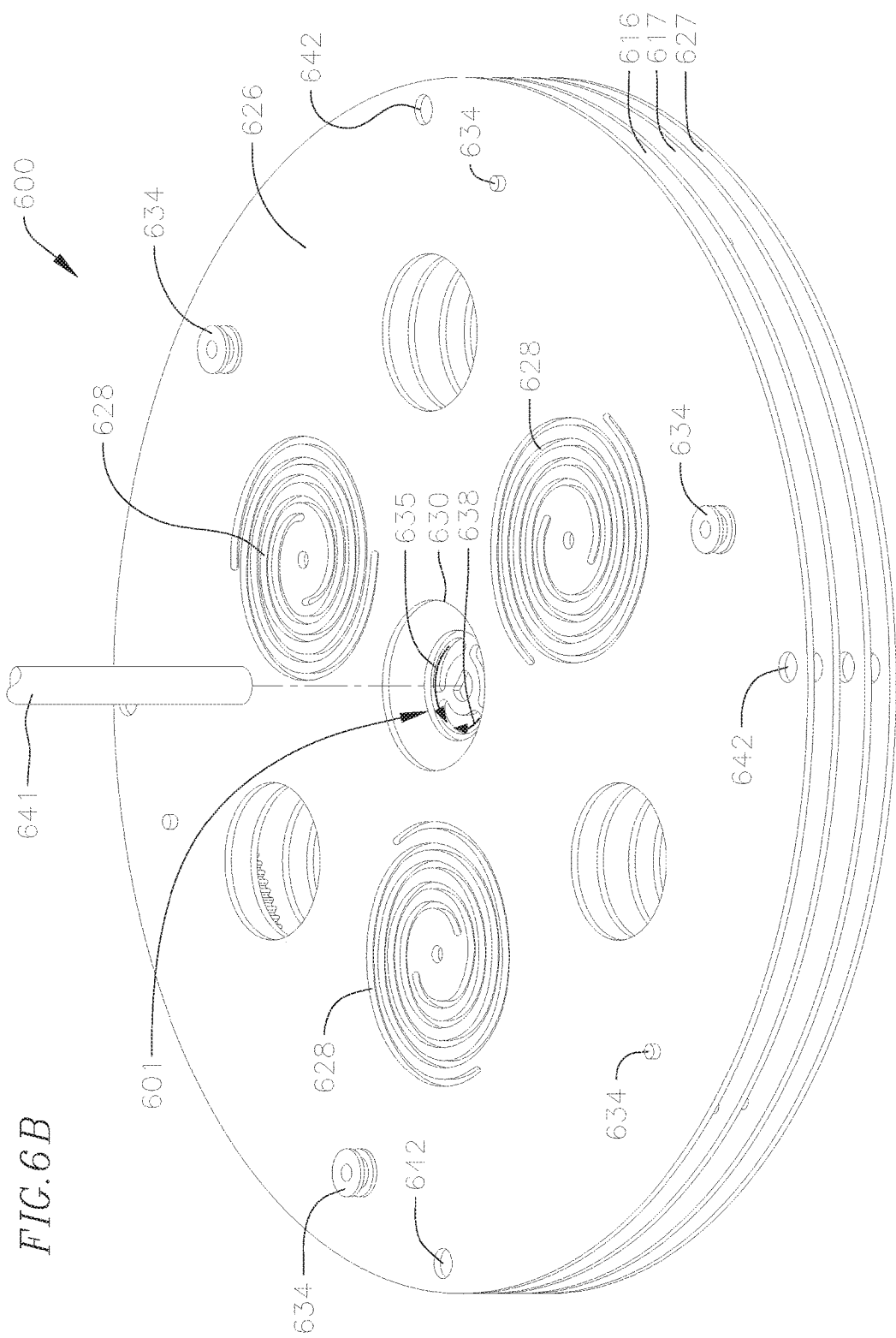

With reference now to FIGS. 6A and 6B, an adjustable negative stiffness mechanism 600 according to another embodiment of the present disclosure includes two or more of the adjustable negative stiffness unit cells 500 illustrated in FIGS. 5A-5D. In the embodiment illustrated in FIGS. 6A and 6B, the adjustable negative stiffness mechanism 600 includes a central input gear assembly 601, three adjustable negative stiffness unit cells 500 arranged around the central input gear assembly 601, and an outer annular assembly 602 extending around the three adjustable negative stiffness unit cells 500. Although in the illustrated embodiment the adjustable negative stiffness mechanism 600 includes three adjustable negative stiffness unit cells 500, in one or more embodiments, the adjustable negative stiffness mechanism 600 may include any other suitable number of adjustable negative stiffness unit cells 500, such as, for instance, from two to eight adjustable negative stiffness unit cells. The multiple adjustable negative stiffness unit cells 500 of the adjustable negative stiffness mechanism 600 provide multiple mounting locations for a payload (e.g., a payload may be coupled to any of the three the adjustable negative stiffness unit cells 500) or two or more payloads may be coupled to two or more of the adjustable negative stiffness unit cells 500.

In the illustrated embodiment, the central input gear assembly 601 includes an upper central gear plate 603 and a lower central gear plate 604 aligned with the upper central gear plate 603. Additionally, in the illustrated embodiment, outer surfaces of the upper and lower central gear plates 603, 604 include a series of teeth 605, 606, respectively (e.g., the outer surfaces of the upper and lower central gear plates 603, 604 are geared). The teeth 605, 606 on the upper and lower central gear plates 603, 604 are configured to engage (e.g., mesh) with the teeth 516, 517 on the upper and lower gear plates 508, 509, respectively, on each of the adjustable negative stiffness unit cells 500.

Additionally, in the illustrated embodiment, the outer annular assembly 602 includes an upper outer annular member 607 and a lower outer annular member 608 aligned with the upper outer annular member 607. The upper and lower outer annular members 607, 608 extend around the adjustable negative stiffness unit cells 500. In the illustrated embodiment, inner surfaces of the upper and lower outer annular members 607, 608 include a series of teeth 609, 610, respectively (e.g., the inner surfaces of the upper and lower outer annular members 607, 608 are geared). The teeth 609, 610 on the upper and lower outer annular members 607, 608 are configured to engage (e.g., mesh) with the teeth 516, 517 on the upper and lower gear plates 508, 509, respectively, on each of the adjustable negative stiffness unit cells 500.

In the illustrated embodiment, the upper and lower outer annular members 607, 608 each also define a series of arcuate notches 611, 612, respectively, the significance of which is described below. The upper and lower outer annular members 607, 608 each also include a series of openings 613, 614, respectively, (e.g., holes) arranged between the arcuate notches 611, 612. In the illustrated embodiment, the adjustable negative stiffness mechanism 600 also includes a series of spacers 615 received in the openings 613, 614. The spacers 615 are configured to space the upper outer annular member 607 apart from the lower outer annular member 608 and to align the upper outer annular member 607 with the upper gear plates 508 of the adjustable negative stiffness unit cells 500 and to align the lower outer annular member 608 with the lower gear plates 509 of the adjustable negative stiffness unit cells 500.

In the illustrated embodiment, the adjustable negative stiffness mechanism 600 also includes an upper cover plate 616 and a lower cover plate 617. The adjustable negative stiffness unit cells 500, the central input gear assembly 601, and the outer annular assembly 602 are disposed between the upper and lower cover plates 616, 617. In the illustrated embodiment, the upper and lower cover plates 616, 617 each define a plurality of openings 618, 619, respectively (e.g., holes) that are aligned (e.g., concentric) with the adjustable negative stiffness unit cells 500. The upper and lower cover plates 616, 617 each also include a series of arcuate notches 620, 621, respectively, configured to align with the arcuate notches 611, 612 in the upper and lower outer annular members 607, 608. Additionally, in the illustrated embodiment, the upper and lower cover plates 616, 617 each also include an access port 622, 623, respectively, (e.g., a hole) aligned (e.g., concentric) with the central input gear assembly 601.

In the illustrated embodiment, the upper and lower cover plates 616, 617 are wider than the upper and lower outer annular members 607, 608 (e.g., the outer diameter of the upper and lower cover plates 616, 617 is larger than the outer diameter of the upper and lower outer annular members 607, 608). Portions of the upper and lower cover plates 616, 617 that extend out beyond the upper and lower outer annular members 607, 608 include a series of openings 624, 625, respectively, (e.g., holes), the significance of which is described below.

Additionally, in the embodiment illustrated in FIGS. 6A and 6B, the adjustable negative stiffness mechanism 600 also includes an upper ortho-planar spring plate 626 and a lower ortho-planar spring plate 627 aligned with the upper ortho-planar spring plate 626. The upper and lower cover plates 616, 617, the adjustable negative stiffness unit cells 500, the central input gear assembly 601, and the outer annular assembly 602 are disposed between the upper and lower ortho-planar spring plates 626, 627. In the illustrated embodiment, each of the upper and lower ortho-planar spring plates 626, 627 includes a series of ortho-planar springs 628, 629, respectively. The ortho-planar springs 628, 629 on the upper and lower ortho-planar spring plates 626, 627 are aligned with the adjustable negative stiffness unit cells 500. Additionally, in the illustrated embodiment, center portions of the ortho-planar springs 628, 629 are fixedly coupled to the center portions of the negative stiffness elements 503. Accordingly, the ortho-planar springs 628, 629 are configured to supply positive-stiffness to the adjustable negative stiffness mechanism 600. In the illustrated embodiment, each of the ortho-planar springs 628, 629 are defined by one or more spiral grooves defined in the upper and lower ortho-planar spring plates 626, 627.

Still referring to the embodiment illustrated in FIGS. 6A and 6B, each of the upper and lower ortho-planar spring plates 626, 627 defines an access port 630, 631, respectively, aligned with the access port 622, 623 in the upper and lower cover plates 616, 617, respectively. Additionally, in the illustrated embodiment, the upper and lower ortho-planar spring plates 626, 627 also define a series of openings 632, 633, respectively, aligned with a portion of the arcuate notches 620, 621 in the upper and lower cover plates 616, 617 and the arcuate notches 611, 612 in the upper and lower outer annular members 607, 608.

In the illustrated embodiment, the adjustable negative stiffness mechanism 600 also includes a series of fasteners 634 coupling the upper ortho-planar spring plate 626 to the lower ortho-planar spring plate 627 and retaining the upper and lower cover plates 616, 617, the adjustable negative stiffness unit cells 500, the central input gear assembly 601, and the outer annular assembly 602 between the upper and lower ortho-planar spring plates 626, 627. In the illustrated embodiment, each of the fasteners 634 extends down through one of the openings 632 in the upper ortho-planar spring plate 626, down through the arcuate notches 620, 621 in the upper and lower cover plates 616, 617 and the arcuate notches 611, 612 in the upper and lower outer annular members 607, 608, and down through a corresponding one of the openings 633 in the lower ortho-planar spring plate 627. The fasteners 634 may be secured to the upper and lower ortho-planar spring plates 626, 627 by any suitable mechanism, such as, for instance, with nuts.

Additionally, the upper and lower ortho-planar spring plates 626, 627 includes a series of openings 642, 643 (e.g., holes), respectively, that are aligned with the openings 624, 625 in the upper and lower cover plates 616, 617. Additionally, in the illustrated embodiment, the adjustable negative stiffness mechanism 600 includes a series of spacers 644 configured to extend through the openings 624, 625 in the upper and lower cover plates 616, 617 and through the openings 642, 643 in the upper and lower ortho-planar spring plates 626, 627. The spacers 644 are configured to align the upper and lower ortho-planar spring plates 626, 627 with the upper and lower cover plates 616, 617. In one or more embodiments, the spacers 644 are also configured to maintain a gap between the upper and lower cover plates 616, 617 and the outer annular assembly 602, the adjustable negative stiffness unit cells 500, and the central input gear assembly 601. Otherwise, friction caused by coupling the upper cover plate 616 to the lower cover plate 617 may prevent or inhibit rotation of the outer annular assembly 602, the adjustable negative stiffness unit cells 500, and/or the central input gear assembly 601, as described below.

As the central input gear assembly 601 is rotated in a first direction (arrow 635), the teeth 605, 606 on the upper and lower central gear plates 603, 604 engage the teeth 516, 517 on the upper and lower gear plates 508, 509 of each of the adjustable negative stiffness unit cells 500 and thereby cause the outer annular members 502 (e.g., the upper and lower gear plates 508, 509) of each of the adjustable negative stiffness unit cells 500 to simultaneously and synchronously rotate (arrow 636) in a first direction. As the outer annular members 502 of the adjustable negative stiffness unit cells 500 are rotated (arrow 636), the clamps 510 and the outer ends 507 of the negative stiffness elements 503 are advanced toward the second ends 514 of the tracks 511, 512 in the upper and lower gear plates 508, 509. As described above with reference to the embodiment of the adjustable negative stiffness unit cell 500 illustrated in FIG. 5D, when the outer ends 507 of the negative stiffness elements 503 are positioned at the second ends 514 of the tracks 511, 512 in the outer annular members 502, the negative stiffness elements 503 are in a compressed (e.g., buckled) state. Additionally, as the central input gear assembly 601 rotates (arrow 635), the teeth 516, 517 on the upper and lower gear plates 508, 509 of the adjustable negative stiffness unit cells 500 engage the teeth 609, 610 on the upper and lower outer annular members 607, 608 and thereby causes the outer annular assembly 602 to rotate (arrow 637) in a direction opposite the direction in which the central input gear assembly 601 is rotating (arrow 635).

As the central input gear assembly 601 is rotated in a second direction (arrow 638) opposite the first direction (arrow 635), the teeth 605, 606 on the upper and lower central gear plates 603, 604 engage the teeth 516, 517 on the upper and lower gear plates 508, 509 of each of the adjustable negative stiffness unit cells 500 and thereby cause the outer annular members 502 of each of the adjustable negative stiffness unit cells 500 to simultaneously and synchronously rotate (arrow 639) in a second direction opposite the first direction. As the outer annular members 502 of the adjustable negative stiffness unit cells 500 rotate (arrow 639), the clamps 510 and the outer ends 507 of the negative stiffness elements 503 are advanced back toward the first ends 513 of the tracks 511, 512 in the outer annular members 502. As described above with reference to the embodiment of the adjustable negative stiffness unit cell 500 illustrated in FIG. 5C, when the outer ends 507 of the negative stiffness elements 503 are positioned at the first ends 513 of the tracks 511, 512 in the outer annular members 502, the negative stiffness elements 503 are in an elongated or relaxed (e.g., uncompressed) state. Additionally, as the central input gear assembly 601 rotates (arrow 638), the teeth 516, 517 on the upper and lower gear plates 508, 509 engage the teeth 609, 610 on the upper and lower outer annular members 607, 608 and thereby causes the outer annular assembly 602 to rotate (arrow 640) in a direction opposite the direction in which the central input gear assembly 601 is rotating (arrow 638). The arcuate notches 611, 612 in the upper and lower outer annular members 607, 608 are configured to permit the upper and lower outer annular members 607, 608 to rotate (arrows 637, 640) without contacting the fasteners 634.

In this manner, the mechanical response of the plurality of the adjustable negative stiffness unit cells 500 may be simultaneously and synchronously adjusted by rotating the central input gear assembly 601 in the desired direction (arrow 635 or arrow 638). Accordingly, the mechanical response of the plurality of the adjustable negative stiffness unit cells 500 may be simultaneously and synchronously adjusted by a single input. Together, the adjustable negative stiffness unit cells 500 and the central input gear assembly 601 function as a planetary gear mechanism.

In one or more embodiments, the central input gear assembly 601 may also include a crank 641 coupled to the upper and lower central gear plates 603, 604 to facilitate adjusting the mechanical response of the adjustable negative stiffness unit cells 500. For instance, in one or more embodiments, the crank 641 may extend down through the access ports 630, 622 in the upper ortho-planar spring plate 626 and the upper cover plate 616 and be coupled to the upper and lower central gear plates 603, 604. In one or more embodiments, the central input gear assembly 601 may be coupled to an output shaft of a motor. The central input gear assembly 601 may be rotated (arrows 635, 638) either manually (e.g., by a hand crank) or automatically (e.g., by a motor).

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "horizontal," "vertical," "upper," "lower," "inner," "outer" and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" or "coupled to" another component, it can be directly on or attached to the other component or intervening components may be present therebetween.

What is claimed is:

1. An adjustable negative stiffness mechanism, comprising:
   a central shaft;
   an outer annular member extending around the central shaft;
   at least one ortho-planar spring extending between the central shaft and the outer annular member;
   at least one coil spring coupled to the central shaft;
   at least two negative stiffness elements extending between the central shaft and the outer annular member, each of the at least two negative stiffness elements having an inner end coupled to the central shaft and an outer end engaging the outer annular member; and
   an actuator coupled to the at least two negative stiffness elements, wherein the actuator is configured to compress and expand the at least two negative stiffness elements to adjust a negative stiffness mechanical response exhibited by the at least two negative stiffness elements,
   wherein the actuator comprises a hydraulic or pneumatic bladder configured to move between an inflated state to compress the at least two negative stiffness elements and a deflated state to expand the at least two negative stiffness elements.

2. The adjustable negative stiffness mechanism of claim 1, wherein each of the at least two negative stiffness elements comprises a first beam bent in a first direction and a second beam bent in a second direction opposite the first direction.

3. An adjustable negative stiffness mechanism, comprising:
   a central shaft;
   an outer annular member extending around the central shaft;
   at least two negative stiffness elements extending between the central shaft and the outer annular member, each of the at least two negative stiffness elements having an inner end fixedly coupled to the central shaft and an outer end engaging the outer annular member; and
   an actuator coupled to the at least two negative stiffness elements, wherein the actuator is configured to compress and expand the at least two negative stiffness elements to adjust a negative stiffness mechanical response exhibited by the at least two negative stiffness elements,
   wherein the actuator comprises a pair of corresponding wedge-shaped members, and wherein a first wedge-shaped member of the pair of wedge-shaped members is configured to slide relative to a second wedge-shaped member of the pair of wedge-shaped members.

4. An adjustable negative stiffness mechanism, comprising:
   a central shaft;
   an outer annular member extending around the central shaft;
   at least two negative stiffness elements extending between the central shaft and the outer annular member, each of the at least two negative stiffness elements having an inner end coupled to the central shaft and an outer end engaging the outer annular member; and
   an actuator coupled to the at least two negative stiffness elements, wherein the actuator is configured to compress and expand the at least two negative stiffness elements to adjust a negative stiffness mechanical response exhibited by the at least two negative stiffness elements,
   wherein the actuator comprises:
   an inner cam surface on the outer annular member configured to engage the outer ends of the at least two negative stiffness elements, the inner cam surface comprising at least one peak and at least one recess, and
   a motor operatively coupled to the outer annular member to rotate the outer annular member around the central shaft, and wherein rotation of the outer annular member around the central shaft alternately aligns the at least one peak on the inner cam surface with the negative stiffness elements to compress the negative stiffness elements and aligns the at least one recess on the inner cam surface to expand the negative stiffness elements.

5. The adjustable negative stiffness mechanism of claim 4, wherein the actuator further comprises a flexure coupled to the outer end of each of the at least two negative stiffness elements, and wherein each of the flexures is configured permit movement of the outer ends of the negative stiffness elements in a first direction and prevent movement of the outer ends of the negative stiffness elements in a second direction perpendicular to the first direction.

6. An adjustable negative stiffness mechanism, comprising:
   a central shaft;
   an outer annular member extending around the central shaft;
   at least two negative stiffness elements extending between the central shaft and the outer annular member, each of the at least two negative stiffness elements having an inner end coupled to the central shaft and an outer end engaging the outer annular member; and
   an actuator coupled to the at least two negative stiffness elements, wherein the actuator is configured to compress and expand the at least two negative stiffness elements to adjust a negative stiffness mechanical response exhibited by the at least two negative stiffness elements,
   wherein the actuator comprises:
   a plurality of tracks defined in the outer annular member, wherein each of the plurality of tracks has a first end spaced apart from the central shaft by a first distance and a second end spaced apart from the central shaft by a second distance greater than the first distance, wherein the outer end of each of the negative stiffness elements is slidably received in one of the plurality of tracks; and a motor operatively coupled to the outer annular member to rotate the outer annular member around the central shaft and move the outer ends of the negative stiffness elements between the first and second ends of the tracks in the outer annular member.

7. An adjustable negative stiffness system, comprising:
a central input gear assembly;
a plurality of adjustable negative stiffness mechanisms arranged around the central input gear assembly, wherein each of the plurality of adjustable negative stiffness mechanisms engages the central input gear assembly, and wherein each of the plurality of adjustable negative stiffness mechanisms comprises:
a central portion configured to receive a central shaft;
an outer annular member extending around the central portion;
at least two negative stiffness elements extending between the central portion and the annular member, each of the at least two negative stiffness elements having an inner end coupled to the central portion and an outer end engaging the outer annular member; and
a plurality of tracks defined in the outer annular member, wherein each of the plurality of tracks has a first end spaced apart from the central portion by a first distance and a second end spaced apart from the central portion by a second distance greater than the first distance, wherein the outer end of each of the negative stiffness elements is slidably received in one of the plurality of tracks; and
an outer ring extending around the plurality of adjustable negative stiffness mechanisms, and wherein each of the plurality of adjustable negative stiffness mechanisms engages the outer ring.

8. The adjustable negative stiffness system of claim 7, wherein the plurality of adjustable negative stiffness mechanisms is from two to ten adjustable negative stiffness mechanisms.

9. The adjustable negative stiffness system of claim 7, further comprising an ortho-planar spring coupled to each of the plurality of adjustable negative stiffness mechanisms.

10. The adjustable negative stiffness system of claim 7, further comprising a drive shaft coupled to the central input gear assembly to rotate the central input gear assembly, wherein rotation of the central input gear assembly synchronously rotates the outer annular members around the central portions and moves the outer ends of the negative stiffness elements between the first and second ends of the tracks in the outer annular member.

11. The adjustable negative stiffness system of claim 7, wherein an outer surface of each the outer annular members of the plurality of adjustable negative stiffness mechanisms comprises a plurality of teeth configured to engage a plurality of teeth on an inner surface of the outer ring and a plurality of teeth on outer surface of the central input gear assembly.

12. An adjustable negative stiffness mechanism, comprising:
a central shaft;
an outer annular member extending around the central shaft, the outer annular member comprising an inner cam surface comprising a plurality of peaks and a plurality of recesses;
at least two negative stiffness elements extending between the central shaft and the annular member, each of the negative stiffness elements having an inner end fixedly coupled to the central shaft and an outer end engaging the inner cam surface;
a flexure coupled to the outer end of each of the at least two negative stiffness elements, and wherein each of the flexures is configured permit movement of the outer ends of the negative stiffness elements in a first direction and prevent movement of the outer ends of the negative stiffness elements in a second direction perpendicular to the first direction; and
a first motor operatively coupled to the outer annular member to rotate the outer annular member around the central shaft, and wherein rotation of the outer annular member around the central shaft alternately aligns the plurality of peaks on the inner cam surface with the outer ends of the negative stiffness elements to compress the negative stiffness elements and aligns the plurality of recesses on the inner cam surface with the outer ends of the negative stiffness elements to expand the negative stiffness elements.

13. The adjustable negative stiffness mechanism of claim 12, further comprising an ortho-planar spring coupled to the central shaft.

14. The adjustable negative stiffness mechanism of claim 12, further comprising:
a top plate coupled to the central shaft;
a bottom plate spaced apart from the top plate, wherein the bottom plate is configured to slide along the central shaft;
at least one coil spring extending between the bottom plate and the top plate; and
a second motor operatively coupled to the bottom plate, wherein the second motor is configured to move the bottom plate toward and away from the top plate to compress and elongate the at least one coil spring.

15. The adjustable negative stiffness mechanism of claim 14, further comprising:
a thrust bearing; and
a coil spring container rotatably supported on the thrust bearing, the coil spring container comprising internal threads configured to engage external threads on the bottom plate, wherein the second motor is configured to rotate the coil spring container such that the external threads engage the internal threads to move the bottom plate toward and away from the top plate to compress and elongate the at least one coil spring.

16. The adjustable negative stiffness mechanism of claim 14, further comprising a containment vessel, wherein the containment vessel houses the outer annular member, the at least two negative stiffness elements, the flexures, the top plate, the bottom plate, and the at least one coil spring, and wherein the first and second motors are coupled to an outer surface of the containment vessel.

17. The adjustable negative stiffness mechanism of claim 13, wherein a position of the ortho-planar spring is adjustable.

* * * * *